United States Patent
Antonopoulos et al.

(10) Patent No.: US 11,671,262 B2
(45) Date of Patent: Jun. 6, 2023

(54) ASYNCHRONOUSLY DETERMINING RELATIONAL DATA INTEGRITY USING CRYPTOGRAPHIC DATA STRUCTURES

(71) Applicant: Microsoft Technology Licensing, LLC, Redmond, WA (US)

(72) Inventors: Panagiotis Antonopoulos, Redmond, WA (US); Jakub J. Szymaszek, Issaquah, WA (US); Raghav Kaushik, Kirkland, WA (US); Conor J. Cunningham, Austin, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 16/888,044

(22) Filed: May 29, 2020

(65) Prior Publication Data

US 2021/0377037 A1 Dec. 2, 2021

(51) Int. Cl.
*H04L 9/32* (2006.01)
*G06F 16/23* (2019.01)
(Continued)

(52) U.S. Cl.
CPC ........ *H04L 9/3239* (2013.01); *G06F 16/2282* (2019.01); *G06F 16/2379* (2019.01); *G06F 16/284* (2019.01); *H04L 9/50* (2022.05)

(58) Field of Classification Search
CPC ..... H04L 9/3239; H04L 9/50; G06F 16/2379; G06F 16/284; G06F 16/2282
See application file for complete search history.

(56) References Cited

U.S. PATENT DOCUMENTS

| 10,873,456 B1* | 12/2020 | Dods | G06N 20/00 |
| 2018/0189312 A1* | 7/2018 | Alas | H04L 9/3239 |

(Continued)

OTHER PUBLICATIONS

"[MS-TDS]: Tabular Data Stream Protocol", Retrieved from: https://docs.microsoft.com/en-us/openspecs/windows_protocols/ms-tds/b46a581a-39de-4745-b076-ec4dbb7d13ec, Dec. 9, 2019, 6 Pages.

(Continued)

*Primary Examiner* — Tamara T Kyle
*Assistant Examiner* — Lahcen Ennaji
(74) *Attorney, Agent, or Firm* — Weaver IP L.L.C.

(57) ABSTRACT

Methods for asynchronously determining relational data integrity using cryptographic data structures are performed by systems and devices. Changes in current tables of relational databases are reflected in associated history tables. Cryptographic hybrid blockchain ledgers are updated with transaction records, for entry changes in current and history tables, including transaction information and hash values of corresponding entry changes. Hybrid blockchain ledgers also include root hash values of Merkle trees of transaction records in current blocks, and hash values of prior blocks. A current block receipt is asynchronously generated and provided as a single hash value from which the validity states of the tables and ledger are able to be verified. Cryptographic receipts of specific transactions reflected in table entry changes are generated and provide immutable evidence of specific transaction existence for users. Ledger-enabled tables are provided for mixed database operations with ledger-disabled tables, and temporal history table database operations are enabled.

20 Claims, 8 Drawing Sheets

(51) Int. Cl.
*G06F 16/28* (2019.01)
*G06F 16/22* (2019.01)
*H04L 9/00* (2022.01)

(56) References Cited

U.S. PATENT DOCUMENTS

2019/0018862 A1* 1/2019 Wu .................. H04L 9/0643
2019/0236559 A1  8/2019 Padmanabhan
2019/0361842 A1* 11/2019 Wood ................ H04L 9/0637

OTHER PUBLICATIONS

"Amazon Quantum Ledger Database (QLDB)", Retrieved from: https://web.archive.org/web/20200504003807/https://aws.amazon.com/qldb/, May 4, 2020, 11 Pages.

Bellare, et al., "Forward Integrity for Secure Audit Logs", In Technical Report, Computer Science and Engineering Department, Nov. 23, 1997, 16 Pages.

Huang, et al., "Store Business-Critical Blob Data with Immutable Storage", Retrieved from: https://docs.microsoft.com/en-us/azure/storage/blobs/storage-blob-immutable-storage?tabs=azure-portal, Nov. 18, 2019, 10 Pages.

Prahalad, Belavadi, "Merkle Proofs Explained", Retrieved from: https://medium.com/crypto-0-nite/merkle-proofs-explained-6dd429623dc5, Jan. 7, 2018, 3 Pages.

Setty, et al., "Enabling Secure and Resource-Efficient Blockchain Networks with VOLT", In Technical Report MSR-TR-2017-38, Aug. 2017, 15 Pages.

Li, et al., "EtherQL: A Query Layer for Blockchain System", In Proceedings of the International Conference on Database Systems for Advanced Applications, Mar. 27, 2017, pp. 556-567.

"International Search Report and Written Opinion Issued in PCT Application No. PCT/US2021/025289", dated Jun. 23, 2021, 12 Pages.

* cited by examiner

US 11,671,262 B2

ASYNCHRONOUSLY DETERMINING RELATIONAL DATA INTEGRITY USING CRYPTOGRAPHIC DATA STRUCTURES

BACKGROUND

Traditional practices for determining data integrity using cryptography include distributed ledgers, blockchains, and key-value pair validations. Distributed ledgers and blockchains attempt to address the complex problem of multi-party computation in an untrusted environment. These solutions are complex to build and deploy, are expensive, and are slow because they require a distributed consensus from associated parties. Additionally, these solutions do not offer rich data and query modeling associated with database functionality. Key-value pair validation solutions are based on flat documents, are not applicable to relational database implementation models, and do not allow the combining sensitive data with other regular data or support receipts that can prove the presence of a specific transaction in a ledger.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for asynchronously determining relational data integrity using cryptographic data structures are performed by systems and devices. Tables in relational databases have entries that are affected or changed by transactions on the underlying data. Maintaining a history of changes in current tables of relational databases is accomplished by reflecting these changes in associated history tables of the database. Cryptographic hybrid blockchain ledgers are updated with transaction records for entry changes in current tables and history tables. Blocks in the ledgers include transaction information in records and hash values of corresponding entry changes. These blocks also include root hash values of hierarchical hash data structures generated over the transaction records in the blocks, and hash values of prior blocks in the hybrid blockchain. Block receipts for current blocks in the hybrid blockchain are asynchronously generated and provided as a single hash value from which the validity states of the tables and ledger are able to be verified. Cryptographic transaction receipts of specific transactions associated with the table entry changes are generated and provide immutable evidence of the existence of a specific transaction in the ledger for a user. Relational data in ledger-enabled tables is used in mixed database operations with relation data in ledger-disabled tables. Additionally, temporal database operations are performed on relational data in history tables.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
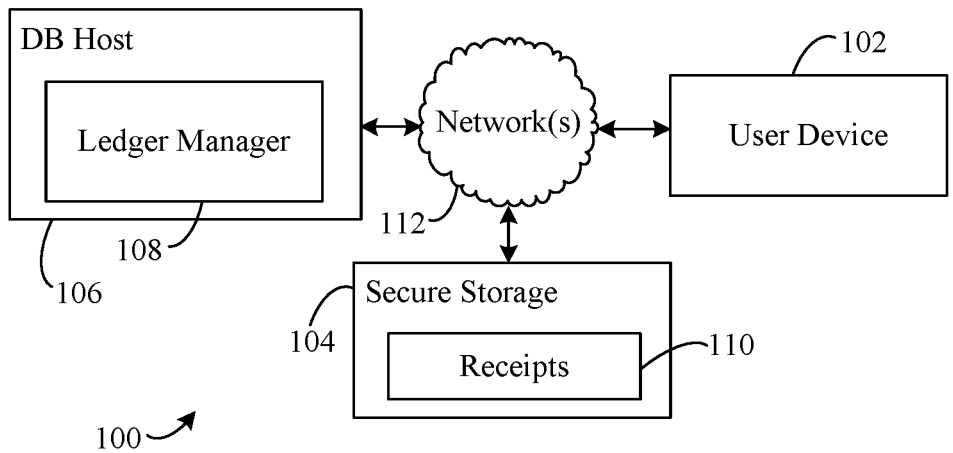
FIG. 1 shows a block diagram of a system for asynchronously determining relational data integrity using cryptographic data structures, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for asynchronously determining relational data integrity using cryptographic data structures. Section III below describes example computing device embodiments that may be used to implement features of the embodiments described herein. Section IV below describes additional examples and advantages, and Section V provides some concluding remarks.

II. Example Embodiments for Asynchronously Determining Relational Data Integrity Using Cryptographic Data Structures Given the ubiquitous nature of software solutions for databases that include sensitive information and/or important transactions, software applications are expected to be trustworthy sources of information. However, providing evidence of data integrity in order to definitively show information sources are trustworthy and secure has previously been complex, time-consuming, and costly, while remaining incomplete, e.g., via external audits and intermediaries such as clearing houses as the actual security of the system is usually not fully reflected in the evidence required by the audits. Additionally, traditional blockchain implementations only offer limited data management and integration capabilities, in addition to having high costs and complexity, as well as requirements for multiple managing parties.

The embodiments herein provide solutions to these issues by asynchronously determining relational data integrity using cryptographic data structures, as described below. In embodiments, a ledger in the form of a cryptographic data structure is provided to address the scenarios above by collecting a detailed history of all modifications in the database and storing it in a tamper-evident manner that guarantees protection against high-privileged users and attackers. This allows querying for the history of all data in the database and cryptographically verifying that the information retrieved has not been tampered with. Additionally, the latest data in the table can be verified as being consistent with the history captured in the ledger. Because the integrity of the ledger is cryptographically verifiable, the transaction history reliable and trusted enough for use as evidence in audits or for resolving disputes related to transactions representing the database.

Accordingly, methods of asynchronously determining relational data integrity using cryptographic data structures are performed by systems and devices, as described herein. Embodiments herein are directed to on-premise and cloud-based systems, such as but not limited to, database (DB) systems (including relational DB systems), project development systems, code repository systems, service systems, etc., as well as to client/user systems and/or devices, through which a system, a user, or an administrator submits DB queries and operations that perform respective actions on tables of relational data. For example, a cloud-based DB service or a stand-alone DB server is configured to update or delete entries in a relational data table of database where the changes correspond to transactions associated with the data. Entry states prior to changes are maintained in a relational history table associated with the data table, and a cryptographic ledger maintains records of transactions, via hashes of changed entries for the data and history tables, in a hybrid blockchain that includes a hierarchical hash data structure, such as a Merkle tree. It is also contemplated herein that a history table includes tables, lists, data files, and/or the like, in various embodiments.

Embodiments herein are applicable to system of record (SOR) applications (e.g., for banking, financial, healthcare, insurance applications, etc.) that maintain transaction histories for accounts, physician visits, prescriptions, medical records, and/or the like, which are expected by users thereof to provide security for their data and be able to prove that no transaction histories, medical records and medical history data, etc., have been improperly changed or otherwise tampered with. Embodiments are also extensible to similar purpose for security information and event management (SIEM) systems including physical access monitoring systems and security logging/monitoring systems, as well as to law enforcement systems that maintain databases of criminal evidence. Additionally, systems for analytics and reporting on shared data in blockchains, and/or the like, are also expected by users thereof to provide security for their data and be able to prove that no data and transaction histories have been tampered with, and the instant embodiments provide for that ability using cryptographic data structures and system implementations described herein. For example, the described embodiments provide an implicit trust in relational DB management systems using unique combinations cryptography technologies to make data tamper-evident. This eliminates the need for expensive audits and intermediaries, and provides transparently-maintained transaction histories in a tamper-evident transaction ledger. Embodiments provide for existing applications to remain unchanged in their underlying functionality, e.g., the full power and capability of a DB server to query relational transaction histories, as well as for rich ecosystems of reporting and development tools. That is, the solutions exemplarily described herein support existing DB server functionalities and are be easily adopted thereby.

In embodiments, detailed histories of all modifications in a relational database table are automatically collected, and the history data is stored in a relational form to allow expressive queries and analytics for auditing, compliance, dispute resolutions, and/or the like. The historical data is protected in a cryptographic, append-only data structure (e.g., a ledger) that guarantees high-privileged users, administrators, attackers, etc., cannot modify the data previously written to the ledger.

Embodiments provide for generating cryptographic receipts. Cryptographic block receipts uniquely describe the full state of the database in a single hash value, including all historical data. That is, embodiments herein provide for cryptographically verifying the full state of the database, including the historical data, using earlier cryptographic block receipts to detect whether tampering of current data tables, history tables, and/or the ledger has been tampered with. Cryptographic transaction receipts are generated to prove that a specific user transaction has been processed by the database at a specific point in time and exists in the ledger. For example, in a banking context, a cryptographic transaction receipt is stand-alone proof of: "<Person X> deposited $100 at <Date and Time>". Accordingly, cryptographic transaction receipts provide non-repudiation for individual transactions even when the ledger or data tables are tampered with after the transaction occurs. In embodiments, this non-repudiation and verification is realized using Merkle proofs in conjunction with the cryptographic transaction receipts, as described in further detail herein.

Various embodiments are directed to protecting relational data for databases in a transparent fashion. In one example, this transparency allows for the software application to interact normally with the database tables, make schema changes, etc., while functionality of the described embodiments for asynchronously determining relational data integrity using cryptographic data structures is implemented. That is, unlike prior solutions, the embodiments herein do not require a dedicated store and/or custom language features—rather, the embodiments seamlessly integrate with software applications.

In some scenarios, a user stores sensitive data in a relational form, and embodiments provide that tampering of this data will be detectable. In one example, a database system implemented in an embodiment allows the user to interact with the data as any normal database table, but will also automatically collect any modifications on this data (e.g., adding, updating, deleting entries) and provide a full report around the modifications while guaranteeing that any current or historical data tampering will be detected. In another aspect, embodiments are directed to storing data in append-only, tamper-evident tables. Such embodiments address scenarios where the software applications are required to securely store sensitive audit or security events, guaranteeing that the event entries are protected from tampering. In such cases, embodiments are applicable to any kind of software applications even if they are not traditionally using a relational database implementation.

To these ends, embodiments include cryptographic data structures in ledgers associated with ledger-enabled data tables and history tables. For instance, a blockchain (i.e., linked list of hashed blocks) hybridized with Merkle trees is used as a cryptographic data structure, in embodiments, where table entries modified for transactions are captured as leaves of a Merkle tree and stored in the current block. This hybrid blockchain efficiently encodes the state of a database in a single hash value, such as an SHA256 hash, computed over a block in the hybrid blockchain. This hash value is generated as a cryptographic block receipt ("block receipt") and is stored in a secure location, e.g., outside of the database in a distributed system, or under a domain that is not accessible via administrator privileges of the DB system, in embodiments, so that it can be later used to verify that the current database state is still consistent with the hash value of the block receipt. Any tampering of the data in the database immediately invalidates the hash value and is detectable. Merkle trees allow for reduced state and transaction information to be stored in each block of a hybrid blockchain, and as noted above, enable the non-repudiation of cryptographic transaction receipts for individual transactions via Merkle proofs.

Data in tables of a database is protected under the "Forward Integrity" trust model that effectively states that any data that is written to the ledger cannot be tampered with at a later point in time without the tampering being detectable. Additionally, the generating of the described hashes and receipts is asynchronous, or not coupled to, transaction or DB operation processing, and therefore, does not significantly impact the database performance and availability for normal operations. Transaction processing for embodiments herein maintains historical data and computes the hash of the data updated/changed by the transaction in current and history tables, but does not require a distributed consensus similar to traditional blockchains and other Byzantine Fault Tolerance (BFT) systems. These security guarantees thus enabled are important, for instance, in cloud-based systems where users/customers can realize a level of control over their data and ensure that their data integrity is protected, while at the same time their implementation also provides for increased processing efficiency and decreased memory footprint.

Another aspect of the described embodiments is that protected data can be combined with any other data in the database through mixed operations to allow for analytical queries across sensitive and regular data together. That is, such operations are enabled to be performed on a mixture of protected and unprotected data. Furthermore, history tables implemented according to embodiments in relational form allow for temporal DB operations, such as "AS OF" operations, to be performed thereon, which enables analytics and forensic investigations that need to process historical data.

Accordingly, the embodiments herein provide solutions to issues for data integrity and storage, for example, in relational data contexts, by enabling robust, efficient, and complete data security and verification, including the ability to track overall database validity states as well as validity of individual transactions. These and other embodiments for asynchronously determining relational data integrity using cryptographic data structures will be described in further detail below in association with the Figures, and in the Sections/Subsections that follow.

Systems, devices, and apparatuses may be configured in various ways for asynchronously determining relational data integrity using cryptographic data structures. For instance, FIG. 1 is a block diagram of a system 100, according to embodiments. System 100 is configured for asynchronously determining relational data integrity using cryptographic data structures, according to embodiments. As shown in FIG. 1, system 100 includes a user device 102, a secure storage 104, and a DB host 106. In embodiments, user device 102, secure storage 104, and a DB host 106 communicate with each other over a network 112. It should be noted that in various embodiments different numbers of user devices, secure storages, and/or DB hosts are present. Additionally, according to embodiments, any combination of the systems and/or components illustrated in FIG. 1 are present in system 100. For example, in embodiments, secure storage 104 comprise a secure portion of DB host 106.

Network 112 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments.

DB host 106 comprises one or more server computers or computing devices, which include one or more distributed or "cloud-based" servers, in embodiments. In embodiments, DB host 106 is associated with, or is a part of, a cloud-based service platform and in some embodiments, DB host 106 comprises an on-premises server(s) in addition to, or in lieu of, cloud-based servers. DB host 106 is configured to host and execute any type of DB server application, such as but not limited to, SQL Server® from Microsoft Corporation of Redmond, Wash. Various systems/devices herein, such as DB host 106, are configured to receive requests for executing queries against a DB, and are configured to perform functions/operations for asynchronously determining relational data integrity using cryptographic data structures. For instance, in embodiments, DB host 106 includes a ledger manager 108 that is configured to perform functions/operations for asynchronously determining relational data integrity using cryptographic data structures, such as but without limitation, including in a history table an entry from a current table of a relational database where the history table is associated with the current table, based on the entry from the current table being designated in a transaction that specifies a change to the entry; updating a ledger of the relational database with a record of the transaction by generating a transaction hash value over the entry in the history table and a changed entry in the current table that is generated by the transaction that was performed on the entry, inserting the transaction hash value and transaction information to the record, generating a hierarchical hash data structure including, as leaf nodes the record and the transaction hash and a plurality of additional records corresponding to prior transactions and respective hash values thereof, and storing, in a current block of a hybrid blockchain, a root hash value of the hierarchical hash data structure, a prior hash value of an immediately preceding block of the hybrid blockchain, the record, and the plurality of additional records; generating, asynchronously with respect to transactions performed on the current table, a block receipt that includes a current hash value of the current block and that captures a validity state of the current table, the history table, and the ledger; and providing the block receipt to a secure data store, and/or the like.

As noted and as described herein, DB host 106 is applicable to any type of system for asynchronously determining relational data integrity using cryptographic data structures, according to embodiments. One example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services such as DB servers hosted by DB host 106, etc., are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants.

Secure storage 104 comprises one or more storage devices and/or storage systems, which include distributed or "cloud-based" devices/systems as well as on-premise devices/systems. Secure storage 104 is associated with, or is a part of, DB host 106, in embodiments. Secure storage 104 includes an immutable storage implementation, in embodiments, e.g., an append-only storage, a write-once-read-many (WORM) storage, a blob storage such as Azure® Blob Storage from Microsoft Corporation of Redmond, Wash., or any other tamper-proof storage, for storing of receipts 110. Receipts 110 comprises cryptographic block receipts and/or cryptographic transaction receipts, in embodiments, which are provided from hybrid blockchain manager DB host 106 in performance of operations for asynchronously determining relational data integrity using cryptographic data structures, as described herein. Secure storage 104 is configured to store such receipts and to return copies or representations of receipts, including reads thereof, upon request from DB host 106.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein, as well as for performing client-side functions/operations of client-server scenarios associated with embodiments such as providing queries to, and performing transactions in tables of, DB host 106. User device 102 may be a computing device of an end-user such as a customer, or of an administrator or internal user associated with DB host 106. User device 102 also includes additional components (not shown for brevity and illustrative clarity) including, but not limited to, components and subcomponents of other devices and/or systems herein, in some embodiments.

DB host 106 is configured in various ways for asynchronously determining relational data integrity using cryptographic data structures. For instance, referring now to FIG. 2, a block diagram of a system 200 is shown for asynchronously determining relational data integrity using cryptographic data structures, according to an example embodiment. System 200 is configured to be an embodiment of system 100 of FIG. 1, e.g., DB host 106. System 200 is described as follows.

Figure 2:
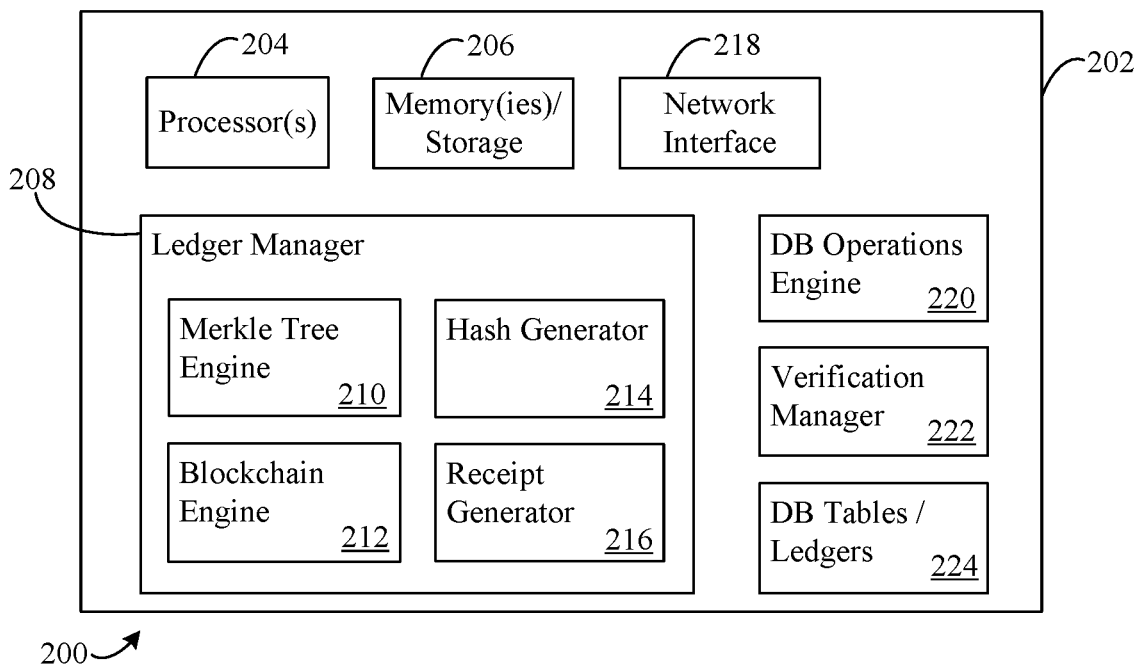
FIG. 2 shows a block diagram of a computing system configured for asynchronously determining relational data integrity using cryptographic data structures, according to an example embodiment.

System 200 includes a computing system 202, which is an embodiment of DB host 106 of FIG. 1, in embodiments, and which is any type of server or computing system, as mentioned elsewhere herein, or as otherwise known. As shown in FIG. 2, computing system 202 includes one or more processors ("processor") 204, one or more of a memory and/or other physical storage device ("memory") 206, as well as one or more network interfaces ("network interface") 218. Computing system 202 includes a ledger manager 208 that is an embodiment of ledger manager 108 of FIG. 1. Ledger manager 208 is configured to perform aspects of asynchronously determining relational data integrity using cryptographic data structures, as described herein, including but without limitation, those described above for ledger manager 108 of FIG. 1, and/or the like. In embodiments, while not shown for brevity and illustrative clarity, ledger manager 208 comprises a portion of a DB server application/service. Computing system 202 also includes a DB operations engine 220 configured to execute query jobs and/or to perform additional and/or standard DB operations as would be understood by one of skill in the relevant art(s) having the benefit of this disclosure, and a verification manager 222 (as part of, or separate from, ledger manager 208) configured to manage and/or perform verification of cryptographic transaction receipts and DB tables/ledgers as described herein. Computing system 202 further includes DB tables and ledgers 224 which comprises one or more tables (e.g., data or current tables, history tables, etc.) and respective, associated ledgers as described herein for asynchronous determinations of relational data integrity using cryptographic data structures.

System 200 also includes additional components (not shown for brevity and illustrative clarity) including, but not limited to, components and subcomponents of other devices and/or systems herein, as well as those described below with respect to FIG. 11, according to embodiments.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of ledger manager 208, including one or more of the components thereof as described herein, DB operations engine 220, and/or verification manager 222, which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, ledger manager 208, including one or more of the components thereof as described herein, DB operations engine 220, and/or verification manager 222, tables and ledgers of DB tables and ledgers 224, and/or the like.

Network interface 218 may be any type or number of wired and/or wireless network adapter, modem, etc., configured to enable system 200, including computing system 202, to communicate with other devices and/or systems over a network, such as communications between computing system 202 and other devices, systems, hosts, of system 100 in FIG. 1 over a network such as network 112.

Ledger manager 208 of computing system 202 includes a plurality of components for performing the functions and operations described herein for asynchronously determining relational data integrity using cryptographic data structures, in embodiments. As illustrated, ledger manager 208 includes a Merkle tree engine 210, a blockchain engine 212, a hash generator 214, and a receipt generator 216, although additional components, as described herein or otherwise, are also included in some embodiments.

Merkle tree engine 210 is configured to generate Merkle trees as cryptographic data structures, and/or portions thereof, based on records of transactions that cause the insertion, modification, and/or deletion of entries in a current table of a database, as well as the insertion of such entries, prior to the transaction, in a history table that is associated with the current table. Merkle tree engine 210 is also configured to regenerate Merkle trees from cryptographic transaction receipts in order to verify that the hash of the transaction-related entry record leads to the correct root hash of the Merkle tree, e.g., via a Merkle proof.

Blockchain engine 212 is configured to generate and update a hybrid blockchain portion of a ledger, as described herein. For example, embodiments herein generate and utilize hybrid blockchains, e.g., that include a Merkle tree, for asynchronously determining relational data integrity using cryptographic data structures, and blockchain engine 212 is configured to add transaction records, Merkle tree portions, and generated hashes to blocks of the hybrid blockchain. Blockchain manager 212 may also be configured to perform additional operations related to hybrid blockchains, as described in further detail herein.

Hash generator 214 is configured to generate hashes, e.g., as hash values, over data, as described herein. In embodiments, any type of hash may be used, such as but without limitation, SHA256 32-byte hashing. Hash generator 214 is configured to generate hash values over table entries associated with transactions that modify such entries, over blocks in a hybrid blockchain, over transaction data and other computed hashes with respect to Merkle tree generation and Merkle proofs, over entries in a history table for performance of history truncation, etc., in embodiments. It should also be noted that hash generator 214 is illustrated separately for purposes of description, but in embodiments, hash generator 214, or instances thereof, may comprise a portion of other components including Merkle tree engine 210, blockchain engine 212, and/or receipt generator 216.

Receipt generator 216 is configured to generate cryptographic receipts. Receipt generator 216 is configured to generate cryptographic receipts asynchronously with respect to standard database operations and transactions, according to embodiments. Cryptographic receipts are provided to users electronically, e.g., to users of user device 102 via network 112 of FIG. 1, and/or are provided electronically to hard-copy output generators such as printers for users, in embodiments, or may be provided for storage as a receipt of receipts 110 in secure storage 104 of FIG. 1. Cryptographic receipts herein include block receipts and transaction receipts. Block receipts comprise a hash value of a block in a hybrid blockchain, along with a set of additional data such as a timestamp of receipt generation (e.g., as a JavaScript Object Notation (JSON) object), a database digital signature (e.g., an RSA signature), etc. Transaction receipts are cryptographic receipts specific to an individual transaction, and are discussed in further detail below with respect to FIGS. 6 and 7.

DB operations engine 220 is configured to perform standard operations of a DB server on tables and ledgers of DB tables and ledgers 224. For example, DB operations engine 220 is configured to perform queries, joins, unions, insertions, deletions, modifications, and/or the like, and as permitted according to embodiments, as would be understood by persons of skill in the relevant art(s) having the benefit of this disclosure. For instance, with respect to history tables, DB operations engine 220 may not be allowed to initiate modification or deletion operations unless so directed by ledger manager 208 for a truncation operation, in embodiments. Likewise, with respect to ledgers, DB operations engine 220 may not be allowed to initiate or perform modification or deletion operations, in embodiments.

Verification manager 222 is configured to perform and/or manage verification operations. Verification operations include, without limitation, verifying receipts against tables and/or ledgers described herein, such as ones of DB tables and ledgers 224, in order to determine the integrity of data therein. Verification manager 222 is configured to perform and/or manage verification operations in conjunction with operations of DB operations engine 220 and/or ledger manager 208, in embodiments. Further details regarding verification operations are described below with respect to FIG. 8.

As noted above for FIGS. 1 and 2, embodiments herein provide for asynchronously determining relational data integrity using cryptographic data structures. System 100 of FIG. 1 and/or system 200 of FIG. 2 may be configured to perform such functions and operations. It is further contemplated that the systems and components described above are configurable to be combined in any way. For example, secure storage 104 of system 100 may comprise a portion of a cloud-based platform and/or an on-premise implementation of system 200, such as for an internal or external storage, according to embodiments.

Figure 3:
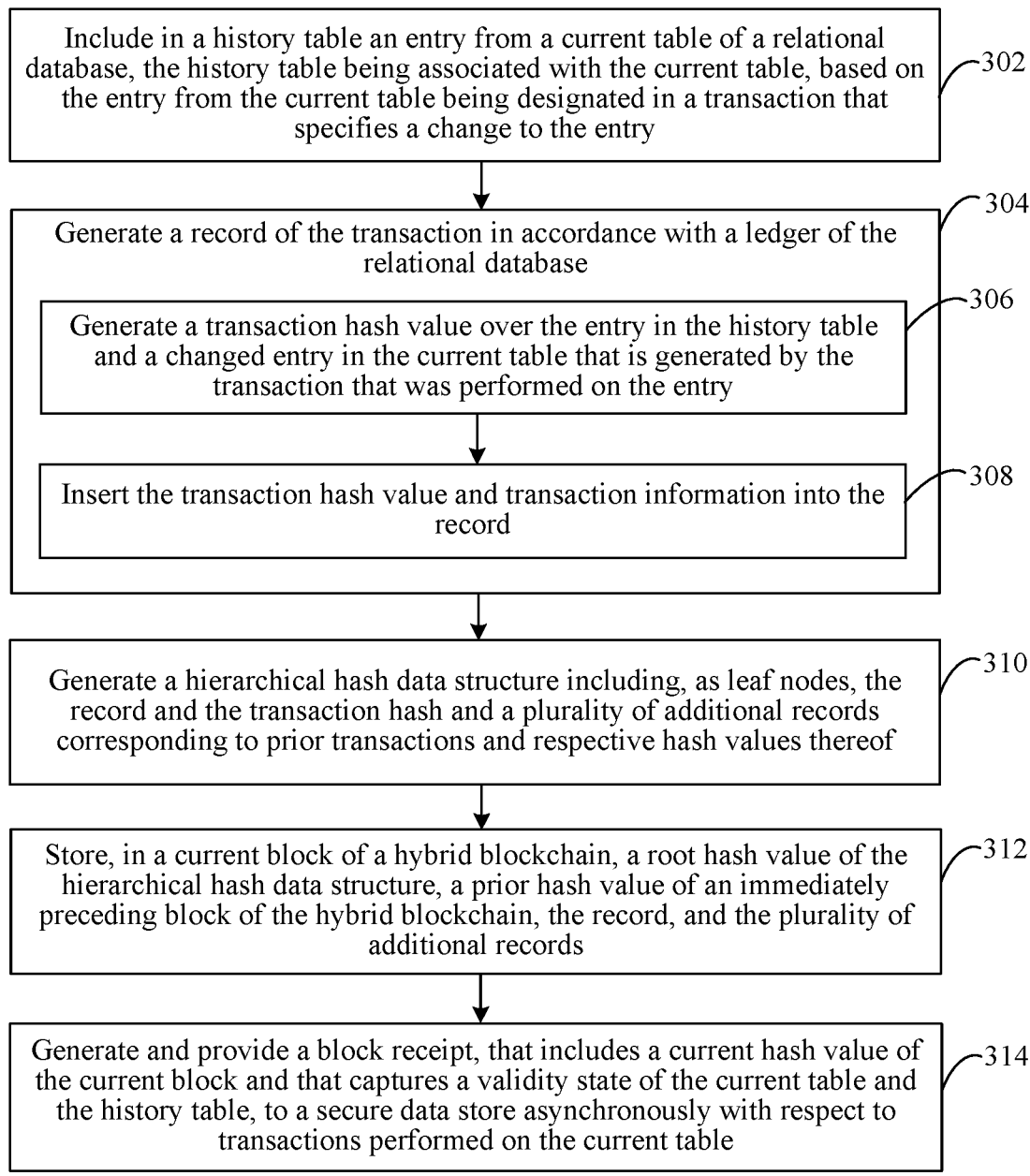
FIG. 3 shows a flowchart for asynchronously determining relational data integrity using cryptographic data structures, in accordance with an example embodiment.
Figure 4:
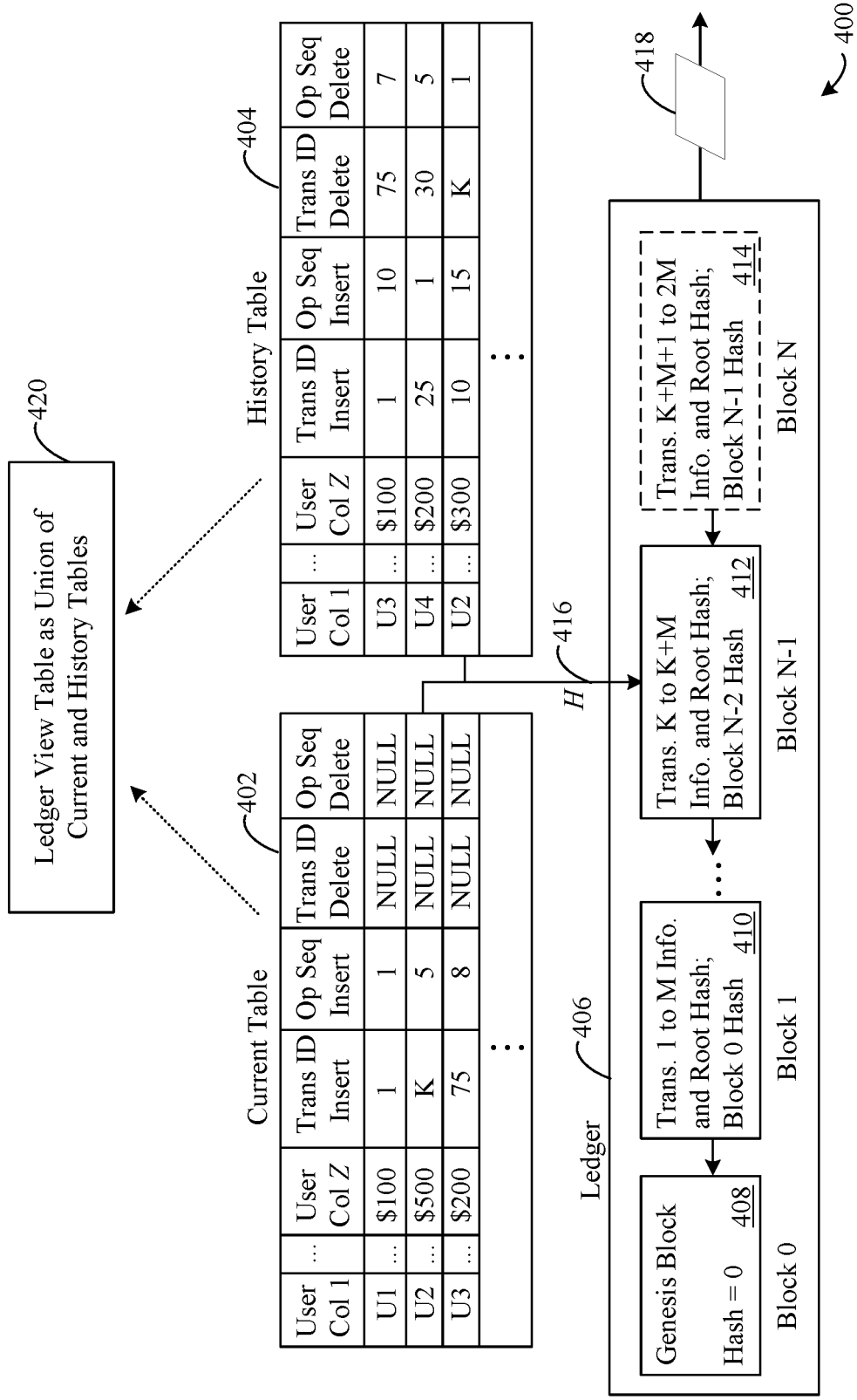
FIG. 4 shows a block diagram of data structures including database tables and a cryptographic data structure used for asynchronously determining relational data integrity, in accordance with an example embodiment.
Figure 5:
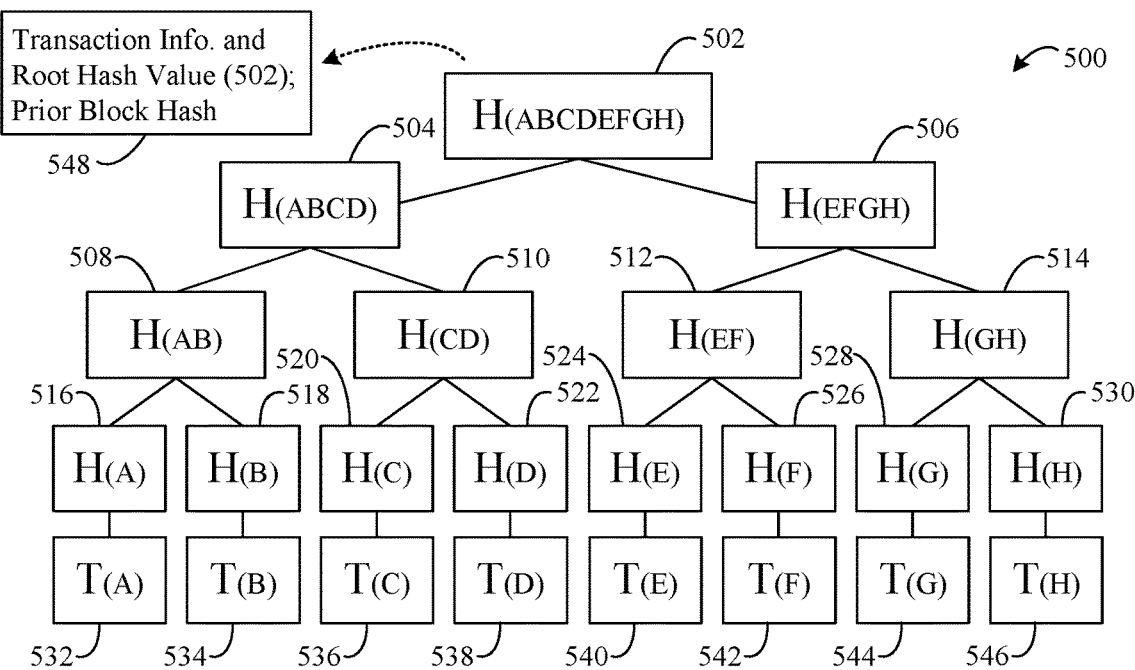
FIG. 5 shows a block diagram of a cryptographic data structure used for asynchronously determining relational data integrity, in accordance with an example embodiment.

FIGS. 3, 4, and 5 will now be described.

FIG. 3 shows a flowchart 300 for asynchronously determining relational data integrity using cryptographic data structures, according to example embodiments. System 100 in FIG. 1 and/or system 200 in FIG. 2 operate according to flowchart 300, in embodiments. Further structural and operational examples will be apparent to persons skilled in the relevant art(s) based on the following descriptions. Flowchart 300 is described below with respect to system 100 of FIG. 1 and system 200 of FIG. 2.

FIG. 4 shows a block diagram of data structures 400 including database tables and a cryptographic data structure used for asynchronously determining relational data integrity, according to an example embodiment. As illustrated, data structures 400 includes a current table 402 and a history table 404, which are ledger-enabled, and a ledger 406 that represents a cryptographic data structure.

FIG. 5 shows a block diagram for a cryptographic data structure 500 used for asynchronously determining relational data integrity, according to an example embodiment. Cryptographic data structure 500 is exemplarily illustrated as a Merkle tree, having a root hash thereof comprising a portion of a block in a hybrid blockchain.

Referring again to FIG. 3, flowchart 300 begins at step 302. In step 302, an entry from a current table of a relational database is included in a history table, the history table being associated with the current table (i.e., a data table reflecting the current state of data), based on the entry from the current table being designated in a transaction that specifies a change to the entry. For example, DB operations engine 220 of system 200 in FIG. 2 may be configured to include an entry, from a current table, in a history table when the entry is designated by a transaction for a change. In embodiments, a history table is specifically associated with a current table to allow this inclusion. In this way, a history table is enable to track all previous changes to entries in the current table.

Turning now to FIG. 4, data structures 400 includes a current table 402 and a history table 404, as noted above. Current table 402 includes entries, shown as rows of data, each row having a number of columns. Current table 402 exemplarily includes, for illustrative purposes, rows for users (e.g., U1, U2, U3, etc.) and corresponding columns denoting user identifiers (IDs), transaction description portions, transaction IDs for insertions and deletions, and operation sequence numbers for insertions and deletions. Likewise, history table 404 includes similar, or the same, columns for rows of entries therein, but the rows of history table 404 include data reflecting each transaction that changes data in current table 402 (e.g., modify, delete, etc.).

It should also be noted that in embodiments, history table 404 is append only for insertions therefor, with the exception of truncation operations discussed below. In the context of step 302 of flowchart 300, an insertion transaction with an ID 'K' and operation sequence number '5' for user 'U2' modifies the second row of current table 402 such that the user column Z is changed to "$500," which causes the insertion into history table 404 of the prior entry of current table 402 (at the third row) for this user with the prior amount "$300," and corresponding insertion transaction ID '10' and operation sequence number '15' as well as the deletion transaction ID 'K' of the transaction that caused the change for this user entry from current table 402. Accordingly, the current state of the entry for U2 is reflected in current table 402, and the prior state is reflected in history table 404.

Referring now to FIG. 3, in step 304 of flowchart 300, a record of the transaction is generated in accordance with a ledger of the relational database. For instance, each record of a ledger includes transaction information for a given transaction, such as but not limited to, a transaction ID, a transaction description, a timestamp of the transaction in the record, and/or a hash value over each entry in a current table and/or a history table changed by the transaction, in embodiments. Blockchain engine 212 and/or DB operations engine 220 of system 200 in FIG. 2 are configured to generate records of transactions, in embodiments, which may be generated in conjunction with hash generator 214 for the generation of hash values. Step 304 may include one or more additional sub-steps, such as step 306 and/or step 308.

In step 306, a transaction hash value is generated over the entry in the history table and a changed entry in the current table that is generated by the transaction that was performed on the entry. For example, hash generator 214 is configured to generate hash values over data. For step 306, and also with reference to FIG. 4, hash generator 214 of system 200 in FIG. 2 is configured to generate a hash value over data rows of current table 402 and/or history table 404 of data structures 400 that correspond to affected entries from a transaction. Continuing with the example for FIG. 4 above, the second row of current table 402 and the third row of history table 404 each have entries affected by the insertion transaction with ID 'K', and hash generator 214 generates a hash value H 416 over these two rows for the generated record referenced in step 304, in this example. Hash value H 416 provides a cryptographic link between ledger 406 and the entries of current table 402 and history table 404.

In step 308, the transaction hash value and transaction information are inserted into the record. For instance, and with reference to FIG. 4, the hash value H generated in step 306, and additional transaction information of the insertion transaction with ID 'K' (e.g., a block ID of a block in a hybrid blockchain, a transaction ID, a transaction description, and/or a timestamp of the transaction) are inserted in to the transaction record for inclusion in ledger 406 by blockchain engine 212 and/or DB operations engine 220 of system 200 in FIG. 2.

That is, the ledger, corresponding to step 304, is exemplarily illustrated as ledger 406 of data structures 400 in FIG. 4. Blockchain engine 212 of system 200 is configured to generate and maintain a hybrid blockchain or framework thereof that comprises a portion of a ledger, according to embodiments. Blockchain engine 212 is configured to generate hybrid blockchains, or portions thereof, in embodiments, and may be configured to structure the blockchain generated and maintained as elements of a table that comprise a ledger, such as ledger 406. Ledger 406 is a cryptographic data structure that comprises the blockchain generated and maintained by blockchain engine 212. Ledger 406 includes a number of blocks having block IDs: a genesis block 408 (ID 'Block 0'), a first block 410 (ID 'Block 1'), etc., up to a current block 412 (ID 'Block N−1'), and it should be noted that additional blocks such as a future block 414 (ID 'Block N') may be generated by blockchain engine 212 for maintenance of the hybrid blockchain as additional entries are changed in current table 402 and add prior entries are reflected in history table 404. Each block of the hybrid blockchain of ledger 406 includes a block ID, a hash value of the immediately preceding block, transaction records in a range of records, and a root hash value taken over all transaction records in the range, according to embodiments.

In step 310, a hierarchical hash data structure is generated that includes, as leaf nodes, the record and the transaction hash, and a plurality of additional records corresponding to prior transactions and respective hash values thereof. For example, Merkle tree engine 210 in FIG. 2 is configured to generate hierarchical hash data structure, such as but not limited to, Merkle trees, in embodiments, which may be generated in conjunction with hash generator 214. Referring also now to FIG. 5, cryptographic data structure 500 is illustrated as a Merle tree having a root hash value H(ABCDEFGH) 502 that represents a hash value over all other hash values in the hierarchy. As illustrated, cryptographic data structure 500 represents eight transactions, T(x): X={A, B, . . . , H}, having respective hash values H(x). As shown, a transaction T(A) 532, a transaction T(B) 534, a transaction T(C) 536, a transaction T(D) 538, a transaction T(E) 540, a transaction T(F) 542, a transaction T(G) 544, and a transaction T(H) 546 respectively have a hash value associated therewith as leaf nodes of cryptographic data structure 500: a hash value H(A) 516, a hash value H(B) 518, a hash value H(C) 520, a hash value H(D) 522, a hash value H(E) 524, a hash value H(F) 526, a hash value H(G) 528, and a hash value H(H) 530. Each of these hash values respectively represents the hash of the corresponding transaction. Cryptographic data structure 500 also includes intermediate, or ancestor, nodes, including first degree ancestor nodes: a hash value H(AB) 508, a hash value H(CD) 510, a hash value H(EF) 512, and a hash value H(GH) 514; and second degree ancestor nodes: a hash value H(ABCD) 504 and a hash value H(EFGH) 506.

The respective hash values of the transactions may each have related hash values: a sibling node and one or more intermediate nodes, or ancestor nodes in cryptographic data structure 500. As an example, consider hash value H(E) 524 of transaction T(E) 540 which has as its sibling node hash value H(F) 526, and its first ancestor as hash value H(EF) 512. Hash value H(EF) 512 itself has a sibling, hash value H(GH) 514, with each of these having an ancestor of hash value H(EFGH) 506 which also has a sibling node (hash value H(ABCD) 504), and which is also a second degree ancestor of hash value H(E) 524. The hash value of each ancestor node comprises a hash value over its children—in other words, each ancestor derives its hash value from each of its children in cryptographic data structure 500. Therefore, root hash value H(ABCDEFGH) 502 is comprised of each node in cryptographic data structure 500. As shown in FIG. 5, root hash value H(ABCDEFGH) 502 may be provided to and stored in a block 548 of a hybrid blockchain such as of ledger 406.

Also now with regard to FIG. 3 and flowchart 300, in step 312, a root hash value of the hierarchical hash data structure, a prior hash value of an immediately preceding block of the hybrid blockchain, the record, and the plurality of additional records are stored in a current block of a hybrid blockchain. For instance, blockchain engine 212 is configured to store the above-mentioned data in ledger 406 of FIG. 4. Current block 412 with ID 'Block N−1' is illustrated in FIG. 4 as having stored therein a root hash value (e.g., root hash value H(ABCDEFGH) 502 of FIG. 5, described above), a prior hash value of an immediately preceding block (e.g., ID 'Block N−2', implicitly shown) of the hybrid blockchain illustrated as ledger 406, the record of step 304 that includes the transaction information thereof, and additional records, e.g., for other transactions that change current table 402 and/or history table 404, generated according to embodiments herein. In embodiments, the record may correspond to a transaction illustrated in FIG. 5, e.g., transaction T(E) 540 of FIG. 5, and the additional records may correspond to, e.g., transaction T(A) 532, transaction T(B) 534, transaction T(C) 536, transaction T(D) 538, transaction T(F) 542, transaction T(G) 544, and transaction T(H) 546 of FIG. 5, e.g., collectively as transactions K to K+M shown in current block 412 with ID 'Block N−1' of FIG. 4.

In step 314, a block receipt is generated, asynchronously with respect to entry transactions performed on the current table, which includes a current hash value of the current block and that captures a validity state of the current table, the history table, and the ledger, and the block receipt is provided to a secure data store. For example, receipt generator 216 is configured to generate cryptographic receipts, such as block receipts. With respect to FIG. 4, a block receipt 418 is illustrated as being generated based on a hash value of current block 412 with ID 'Block N−1'. In this way, a single hash value, e.g., in block receipt 418, enables verification to be performed on data in the database, e.g., in current table 402, history table 404, and ledger 406, that was present at and before generation of block receipt 418. Verification is described in further detail below. In embodiments, block receipt 418 also includes a set of additional data such as a timestamp of block receipt generation (e.g., as a JSON object), a database digital signature (e.g., an RSA signature), and/or the like. After generation, block receipt 418 is provided to a secure storage for receipts such as receipts 110 of secure storage 104 in FIG. 1.

In embodiments, the steps of flowchart 300, including block receipt generation, are performed asynchronously with respect to transactions that affect current and history tables, and with respect to regular operations performed on tables by a DB host, e.g., via DB operations engine 220. For example, steps of flowchart 300 may be performed only after the corresponding transaction has been committed. In this manner, regular processing operations are not inhibited substantially by generating the ledger and receipts, e.g., computing hash values for data are the only operations that are not negligible.

After step 314, flowchart 300 of FIG. 3 may conclude.

Additionally, with respect to FIG. 4, embodiments provide for a view of a ledger (i.e., a ledger view table) that comprises a union of the current table and the history table. As shown for data structures 400, a ledger view table 420 is a table that includes a union of the data in current table 402 and the data in history table 404. Ledger view table 420 may be queries or otherwise operated on by DB operations engine 220, or by ledger manager 208, in various embodiments, and thus provides a consolidate view of the current state of the data as well as all transactions previously performed on the current table.

Embodiments herein also provide for the generation of cryptographic transaction receipts that are transaction-specific, and which are also generated asynchronously with respect to transactions that affect current and history tables, and with respect to regular operations performed on tables by a DB host, e.g., via DB operations engine 220. Cryptographic transaction receipts of specific transactions that are reflected in table entry changes provide immutable evidence of the existence for specific transaction related data associated with users.

That is, embodiments herein provide for the generation of cryptographic transaction receipts that prove that a specific transaction has been part of the ledger and guarantee non-repudiation even if the ledger is tampered with or destroyed. Effectively, the cryptographic transaction receipt is stand-alone proof, in and of itself—that is, cryptographic transaction receipts do not require the ledger to be available to verify that the transaction occurred. For example, each transaction is assigned a description that defines the intent of the transaction, either explicitly by the user by specifying any description desired (e.g. "Person X deposited $100 to account Y"), or internally generated by, e.g., receipt generator 216 or another component, based on the commands executed by the transaction (e.g. executing a particular procedure "<command_name>($100, Y)" in this example). When the transaction is committed, the cryptographic transaction receipt is added as a node in a hybrid blockchain/Merkle tree data structure. In one aspect of the described embodiments, a signature may be used for cryptographic transaction receipts (e.g., an RSA asymmetric signature) for each transaction, including the description thereof, with a private key that the data owner manages. Users are then able to verify the signature is valid and therefore have standalone evidence that their transaction was processed. In other aspects of the embodiments herein, a more performance-enhancing process is utilized, such as a hierarchical hash data structure like a Merkle Tree portion of a hybrid blockchain, which allows the use of Merkle proofs to verify a specific node of the tree in logarithmic time, without having to process all other nodes in the tree. To prove that a specific transaction is in the ledger, the cryptographic transaction receipt contain the sibling node for the hash value of this transaction and the siblings of its ancestors, as described herein. In such embodiments, only the root hash of the Merkle Tree may be signed, and the additional information is used to verify that the root hash can be computed correctly given the transaction and does not need to be signed. Accordingly, in embodiments, verification includes using the transactions (including their descriptions described herein) and the sibling/ancestor hash information to compute the root hash for the Merkle tree, and verifying that the computed root hash is consistent with the signed root hash provided in the cryptographic transaction receipt. This allows for the provision of receipts for any transaction represented in the ledger, e.g., in the Merkle tree, with only one signature, i.e., for the root hash value. Therefore, embodiments enable the full performance of the database is not noticeably inhibited while still providing individual cryptographic receipts for any transaction.

Figure 6:
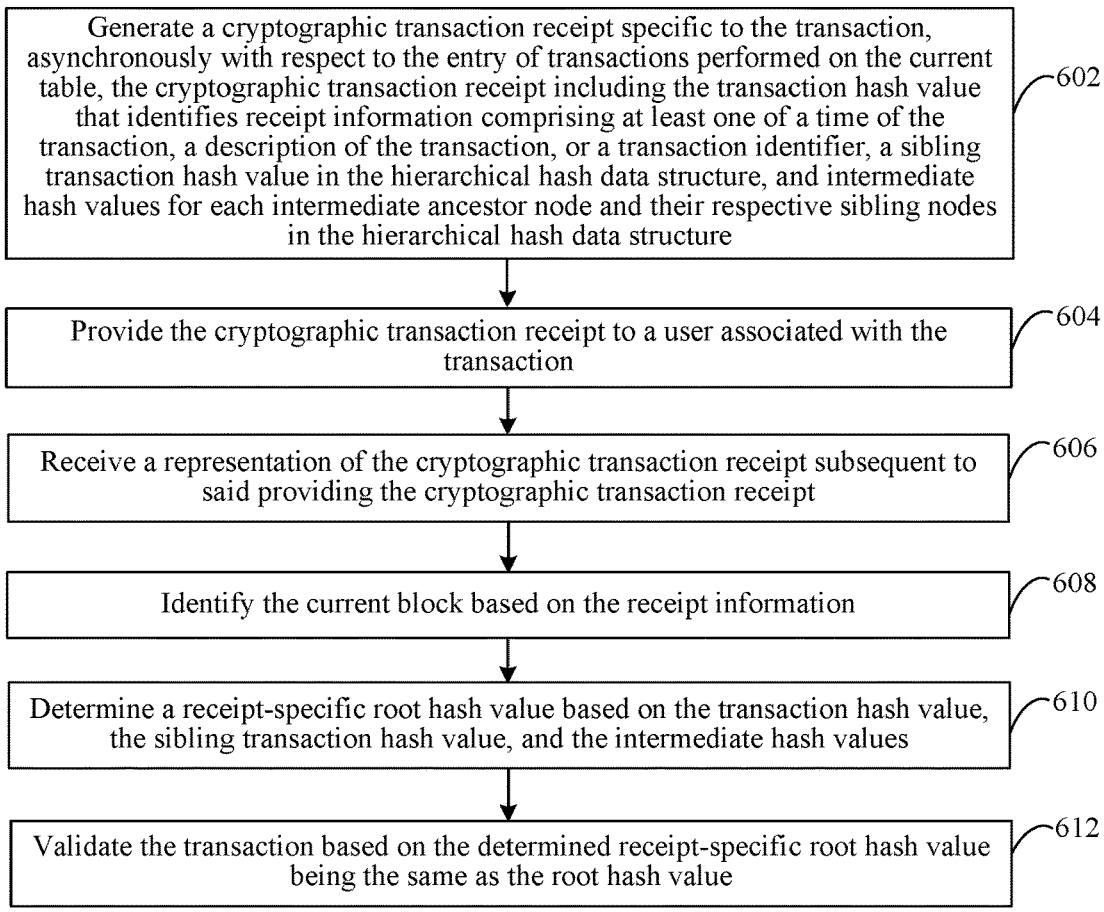
FIG. 6 shows a flowchart for asynchronously determining relational data integrity using cryptographic data structures, in accordance with an example embodiment.
Figure 7:
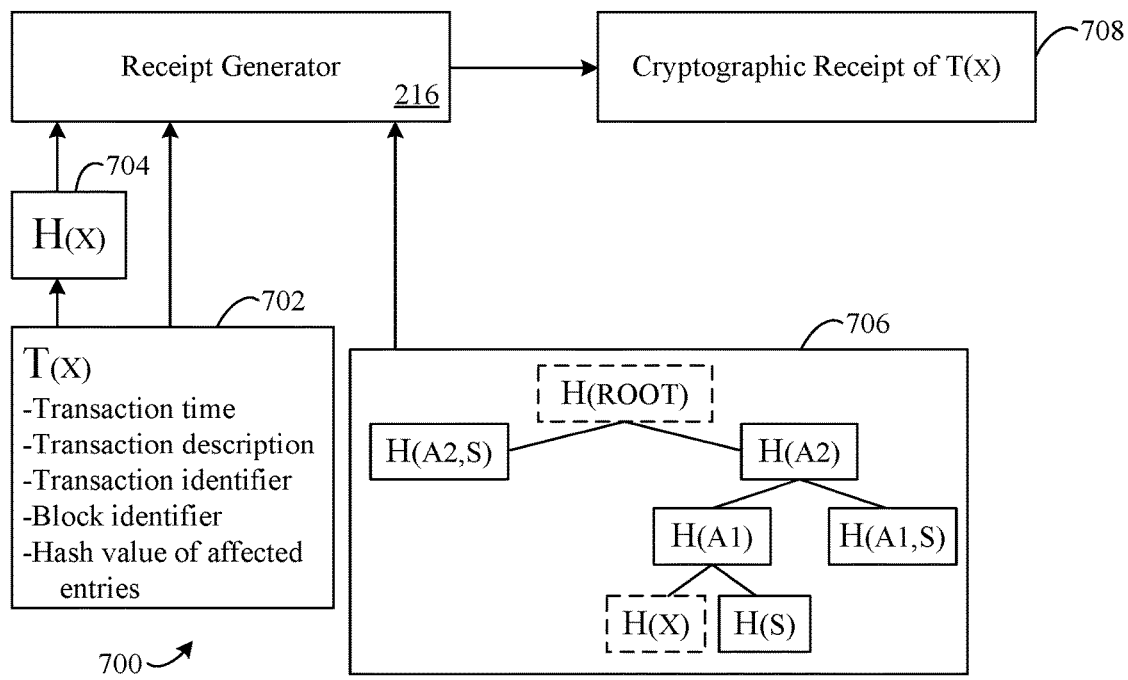
FIG. 7 shows a flow diagram for asynchronously determining relational data integrity using cryptographic data structures, in accordance with an example embodiment.

For instance, FIGS. 6 and 7 will now be described. In FIG. 6 a flowchart 600 for asynchronously determining relational data integrity using cryptographic data structures is shown, according to an example embodiment. FIG. 7 shows a flow diagram 700 for asynchronously determining relational data integrity using cryptographic data structures, according to an example embodiment. System 100 in FIG. 1 and/or system 200 in FIG. 2 may operate according to flowchart 600, which may be an embodiment of flowchart 300 of FIG. 3, and according to flow diagram 700. Further structural and operational examples will be apparent to persons skilled in the relevant art(s) based on the following descriptions. Flowchart 600 and flow diagram 700 are described below primarily with respect to system 100 of FIG. 1 and system 200 of FIG. 2, and cryptographic data structure 500 of FIG. 5.

In FIG. 6, flowchart 600 begins with step 602. In step 602, a cryptographic transaction receipt specific to the transaction is generated, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure. For instance, receipt generator 216 of system 200 in FIG. 2 is configured to generate receipts, as noted herein, including but not limited to, cryptographic transaction receipts or transaction receipts that are specific to a particular, individual transaction, according to embodiments. In embodiments, receipt generator 216 is configured to generate cryptographic transaction receipts using a public-private key pair associated with the DB host having the database of which the current table, history table, and ledger are a portion. In this way, embodiments provide that a generated cryptographic transaction receipt that is signed with such a private key of the key pair is self-verifiable even when the database is altered, corrupted, deleted, etc., via the corresponding public key of the key pair. Additionally, this prevents the altering of generated cryptographic transaction receipts by their recipients.

Referring also to FIG. 7 for flow diagram 700, receipt generator 216 is also shown. Receipt generator 216 is configured to receive a transaction record 702 for a transaction T(x) that is generated for changes to tables caused by a transaction thereon, e.g., as described above with respect to step 304 of flowchart 300 in FIG. 3. Transaction record 702, as shown, includes a transaction time, a transaction description, a transaction identifier, a block identifier, and a hash value of entries in tables affected by the transaction, e.g., as generated by hash generator 214. Receipt generator 216 receives transaction record 702 and a hash value 704 ("H(x)") of transaction record 702, e.g., as generated by hash generator 214. Hash value 704 represents a node in a hierarchical hash data structure associated with transaction record 702, in embodiments. As an example, in FIG. 5, cryptographic data structure 500 represents a hierarchical hash data structure, such as a Merkle tree, described above with respect to step 310 of flowchart 300 in FIG. 3. Receipt generator 216 also receives related hash values 706 including a sibling hash value H(s) of transaction hash value 704 from a hierarchical hash data structure, as well as intermediate hash values for each intermediate ancestor node H(a1) and H(a2) of the node for hash value 704 and their respective sibling nodes H(a1,s) and H(a2,s) in the hierarchical hash data structure, as similarly described above with respect to step 310. Based on hash value 704 and related hash values 706, a root hash value (e.g., H(ROOT)) can later be determined from this information as described herein.

Based at least on transaction record 702, hash value 704, and related hash values 706, receipt generator 216 generates a cryptographic transaction receipt 708 (also a "transaction receipt" or "cryptographic receipt") that is specific to transaction T(x) and that provides non-repudiation for the existence of transaction T(x) in a ledger even when the ledger or its associated data tables are tampered with after transaction T(x) occurs, as discussed in further detail below. Also, as noted above, in embodiments receipt generator 216 is configured to generate cryptographic transaction receipt 708 using a public-private key pair associated with the database in which the tables and ledger are maintained.

Referring again to FIG. 6, in step 604 of flowchart 600, the cryptographic transaction receipt is provided to a user associated with the transaction. For instance, cryptographic transaction receipts (such as cryptographic transaction receipt 708 in FIG. 7) are provided to users electronically, e.g., to users of user device 102 via network 112 of FIG. 1, and/or are provided electronically to hard-copy output generators such as printers for users, in embodiments, or may be provided for storage as a receipt of receipts 110 in secure storage 104 of FIG. 1. Cryptographic transaction receipts may be provided by receipt generator 216 via network interface 218, in embodiments.

In step 606, a representation of the cryptographic transaction receipt is received subsequent to said providing the cryptographic transaction receipt. For example, subsequent to generating and providing a cryptographic transaction receipt as discussed immediately above, a cryptographic transaction receipt may be received by verification manager 222 of system 200 in FIG. 2 to verify the transaction associated with the cryptographic transaction receipt. The cryptographic transaction receipt may be provided as evidence that the transaction associated therewith existed in a ledger and associated data tables, e.g., when data is tampered with, when discrepancies are noted within the ledger and/or data tables, to prove the transaction occurred at a specific time, and/or the like.

In some embodiments, receipt of cryptographic transaction receipts or representations thereof is performed at client devices such as client device 102 in FIG. 1. A user of such a user device is thus enabled to utilize a cryptographic transaction receipt as a stand-alone object to guarantee non-repudiation even when the ledger is tampered with, corrupted, destroyed, etc. Here, an instance of verification manager 222 in FIG. 2 may also be present and executed by client device 102, or on any other system, and does not require any access to the ledger at least because the cryptographic transaction receipt includes enough information for validation thereof, discussed in further detail below for step 610.

In step 608, the current block is identified based on the receipt information. For instance, verification manager 222, alone or in conjunction with ledger manager 208, is configured to verify the transaction associated with the cryptographic transaction receipt, which includes identifying the current block in the ledger at the time the transaction occurred and the cryptographic transaction receipt was generated. Because the cryptographic transaction receipt includes the transaction record/information (e.g., including a block identifier) and the hash value thereof, as noted, above, the current block in the ledger is able to be identified by verification manager 222 and/or blockchain engine 212.

In step 610, a receipt-specific root hash value is determined based on the transaction hash value, the sibling transaction hash value, and the intermediate hash values. For example, as noted above, each block in a hybrid blockchain of a ledger includes a root hash value of a hierarchical hash data structure, e.g., root hash value H(ABCDEFGH) 502 of the Merkle tree representation shown in FIG. 5. In embodiments, the use of a Merkle tree as the hierarchical hash data structure enables the use of Merkle proofs to calculate a receipt-specific root hash value from information in the cryptographic transaction receipt. That is, with the transaction hash value, the sibling transaction hash value, and the intermediate hash values (e.g., related hash values 706 shown in FIG. 7), the receipt-specific root hash value for the cryptographic transaction receipt specific to the transaction can be calculated via Merkle proof. In embodiments, verification manager 222 and/or Merkle tree engine 210 are configured to perform the Merkle proof and calculate the receipt-specific root hash value.

Also, continuing with the stand-alone, non-repudiation example above, an instance of verification manager 222 at a user device, or other system, along with, e.g., one or more of instances for a hash generator and/or a Merkle tree engine at the user device, is configured to utilize Merkle proofs as noted above, to calculate the receipt-specific root hash value for verifying the transaction of the cryptographic transaction receipt. Accordingly, even when the ledger is destroyed or tampered with, or is otherwise unavailable to the user of the user device, the performance of the Merkle proof (with its intermediate hashes) still allows for the receipt-specific root hash to be verified against the root hash value stored as a part of the cryptographic transaction receipt, and this evidence allows for the cryptographic transaction receipt to act as a stand-alone object embodying non-repudiation for the transaction.

In step 612, the transaction is validated based on the determined receipt-specific root hash value being the same as the root hash value. For instance, verification manager 222 is configured to determine if the receipt-specific root hash value calculated in step 610 is the same as the root hash value stored in the current block of the ledger associated with the transaction. If a match is determined, the transaction is validated against the ledger. If not, the validation fails. If the validation fails, further verification may be performed, as discussed in further detail below with respect to FIG. 8, to determine if the ledger or associated tables have been tampered with.

Figure 8:
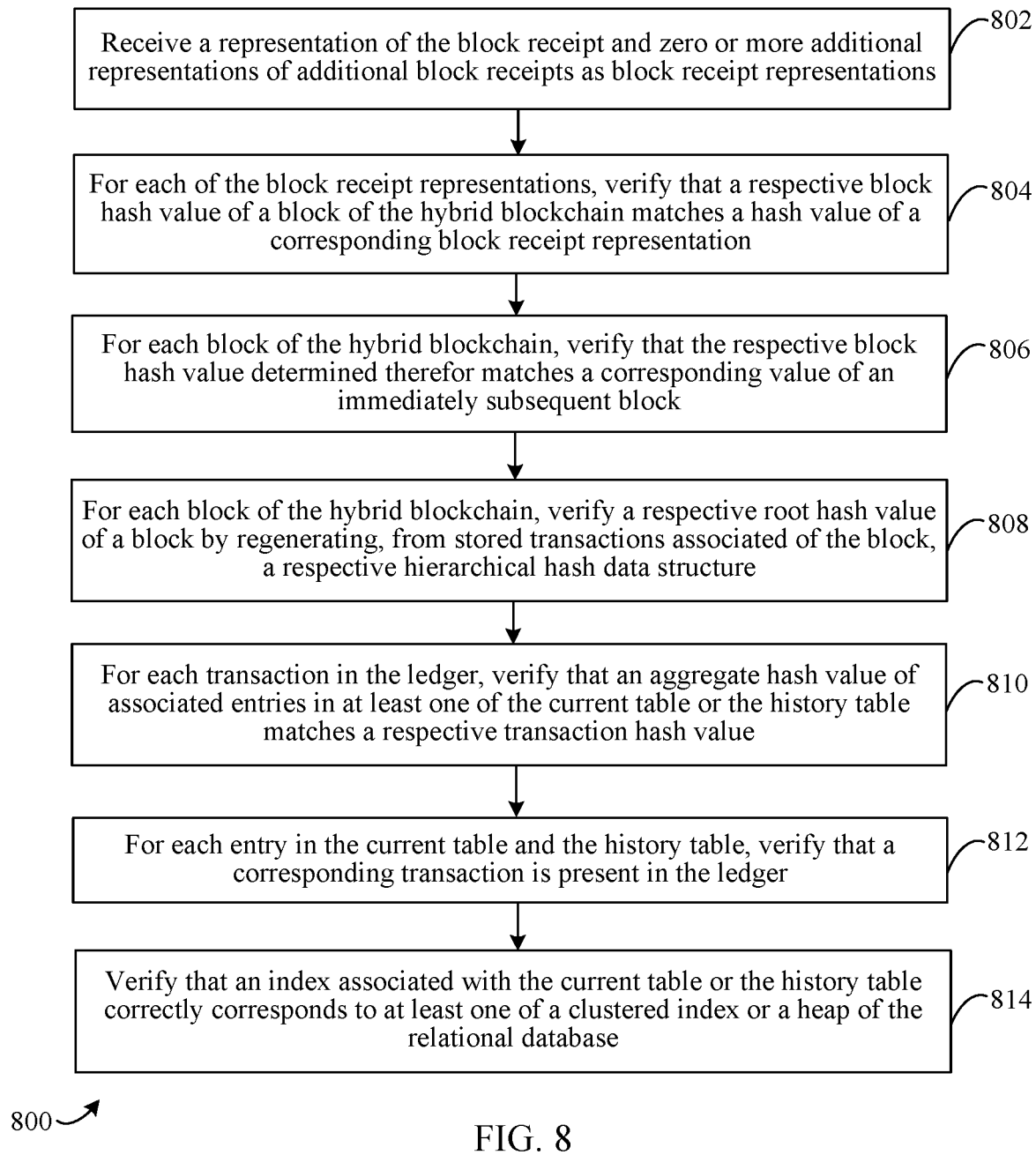
FIG. 8 shows a flowchart for asynchronously determining relational data integrity using cryptographic data structures, in accordance with an example embodiment.

FIG. 8 will now be described. As noted herein, embodiments provide for complete verification of underlying data sets of a database, in ways uncoupled from the data and normal data transactions/operations, or as described, asynchronously determining relational data integrity using cryptographic data structures and block receipts for a ledger. The verification process verifies that the current state of the ledger and tables is consistent with the state as of the time each of the block receipts was generated. FIG. 8 illustrates verification of a data set of a database, including ledgers as described herein. In embodiments, verification manager 222 and/or DB operations engine 220 are configured to perform one or more verification aspects, e.g., via lookups, queries of tables, and/or the like, using optimal query plan selection, parallelism, external sorts and hash-joins, etc., to optimize the verification process without any additional resource costs. For example, data structures described herein may be implemented as tables on which verification operations are performed.

FIG. 8 shows a flowchart 800 for performance of such verification and determination of relational data integrity, according to an example embodiment. System 100 in FIG. 1 and/or system 200 in FIG. 2 may operate according to flowchart 800, which may be an embodiment of flowchart 300 of FIG. 3. Further structural and operational examples will be apparent to persons skilled in the relevant art(s) based on the following descriptions. Flowchart 800 is described below primarily with respect to system 100 of FIG. 1 and system 200 of FIG. 2, and data structures 400 of FIG. 4.

Flowchart 800 illustrates the performance of verification of a current table, a history table, and a ledger of a database, in embodiments, begins with step 802, and includes one or more of the additional following steps.

In step 802, a representation of the block receipt and zero or more additional representations of additional block receipts as block receipt representations are received. For example, as shown in data structures 400 of FIG. 4, ledger 406 comprises a hybrid blockchain having a number of blocks. At relatively earlier points in time from the creation of ledger 406, genesis block 408 (ID 'Block 0') which has no meaningful prior hash value (zero) stored is the only block, but after some time period in which transactions affect entries in current table 402 and history table 404, first block 410 (ID 'Block 1') is generated and completed which stores the hash value over 'Block 0'. Here, a verification can be performed with respect one block of meaningful cryptographic data, i.e., first block 410 which at that time would be the current block for transactions. At even later points in time, additional transactions may occur, and additional blocks are added to ledger 406, e.g., up to a current block 412 (ID 'Block N−1') in the illustrated example, and even further in time additional blocks, e.g., future block 414 (ID 'Block N') may be generated by blockchain engine 212 for maintenance of the hybrid blockchain as additional entries are changed in current table 402 and add prior entries are reflected in history table 404. The cryptographic block receipts (e.g., block receipt 418) and/or representations thereof for one or more blocks of ledger 406 are provided or retrieved from a secure storage such as secure storage 104 in FIG. 1, and are received by verification manager 222 in embodiments for performance of verification of one more tables and/or ledgers associated with a data set of a database. As noted above, block receipts comprise a hash value of a block in a hybrid blockchain, along with a set of additional data such as a timestamp of receipt generation (e.g., as a JSON object), a database digital signature (e.g., an RSA signature), and/or the like, according to embodiments.

In step 804, for each of the block receipt representations, it is verified that a respective block hash value of a block of the hybrid blockchain matches a hash value of a corresponding block receipt representation. For instance, verification manager 222 is configured to determine if the hash value of a block in a received block receipt matches the corresponding hash value for a block in the ledger. In the example illustrated in FIG. 4, block receipt 418 includes the hash value generated over current block 412 (ID 'Block N−1'). Verification manager 222 generates, or causes to be generated, e.g., via hash generator 214, a hash value of current block 412 (ID 'Block N−1'), and verifies that the generated hash value is the same as the hash value in block receipt 418. In embodiments, this determination is performed for each block receipt and corresponding block in the ledger.

In step 806, for each block of the hybrid blockchain, it is verified that the respective block hash value determined therefor matches a corresponding value of an immediately subsequent block. For example, as described above, each block in a hybrid blockchain of a ledger stores the hash value of an immediately preceding block. In embodiments, verification manager 222 is configured to verify that these hash values are the same. In the illustrated example of FIG. 4, it is shown that first block 410 (ID 'Block 1') includes the hash value of genesis block 408 (ID 'Block 0'), the hash value of first block 410 (ID 'Block 1') is included in an implicitly represented block with ID 'Block 2', and so on through current block 412 (ID 'Block N−1') which includes the hash value of an implicitly represented block with ID 'Block N−2'. The hash values generated in step 804 for each of the blocks of ledger 406 are thus available for verification by verification manager 222 against the hash values stored in the respective, subsequent blocks.

In step 808, for each block of the hybrid blockchain, a respective root hash value of a block is verified by regenerating, from stored transactions associated of the block, a respective hierarchical hash data structure. For instance, verification manager 222 and/or Merkle tree engine 210, in conjunction with hash generator 214 in embodiments, are configured to verify the root hash value stored in a given block of ledger 406 is the same as a generated root hash value determined from the transaction records in the given block. Referring again to FIG. 4, current block 412 (ID 'Block N−1') includes transaction information and records of transactions 'K' to 'K+M' and the root hash value of the hierarchical hash data structure as generated in step 310 of flowchart 300 in FIG. 3 with reference to cryptographic data structure 500 in FIG. 5, and stored in the block at step 312. As the transaction records used to generate the stored root hash value of the hierarchical hash data structure are included in current block 412 (ID 'Block N−1'), verification manager and/or Merkle tree engine 210 calculate the hash values of these transaction records and regenerate the hierarchical hash data structure to determine a regenerated root hash value of the block in question. The regenerated root hash value is then verified against the stored root hash value to validate its correctness and integrity against tampering and/or corruption.

In step 810, for each transaction in the ledger, it is verified that an aggregate hash value of associated entries in at least one of the current table or the history table matches a respective transaction hash value. For example, verification manager 222 and/or hash generator 214 are configured to compute hash values aggregated over changed entries in tables to verify that transaction records stored in blocks of a ledger match each other. That is, information in transaction records in the ledger includes indicia of affected entries in the current and history tables and a previously determined aggregate hash values. These hash values are re-generated in step 810, as described herein, to verify the stored aggregated hash values correspond to entries presently stored in the tables.

In step 812, for each entry in the current table and the history table, it is verified that a corresponding transaction is present in the ledger. For instance, verification manager 222 is configured to determine each transaction that is present in the ledger and verify that the corresponding entries in the current table and the history table remain present. In embodiments, verification manager 222 and/or DB operations engine 220 are configured to perform this verification, e.g., via lookups, queries of tables, and/or the like.

In step 814, it is verified that an index associated with the current table or the history table correctly corresponds to at least one of a clustered index or a heap of the relational database. As will be appreciated by those of skill in the relevant art(s) having the benefit of this disclosure, indices are used by databases to more efficiently perform operations. In the context of the disclosed embodiments, current and history tables may also have one or more associated indices. Any such associated indices are verified by verification manager 222 as corresponding to clustered indices or a heap of the database as a validation of their correctness and integrity.

Embodiments herein also provide for the ability to perform database operations on protected data. For instance, ledger-enabled tables may be used together with tables that are not ledger-enabled (or ledger-disabled) in database operations such as queries. In other words, sensitive data that is protected via a ledger (e.g., data in current and history tables) for asynchronously determining relational data integrity using cryptographic data structures is relational and can be used in conjunction with other relational tables of a database in normal operations. Additionally, embodiments allow for temporal operations to be performed on history tables described herein.

Figure 9:
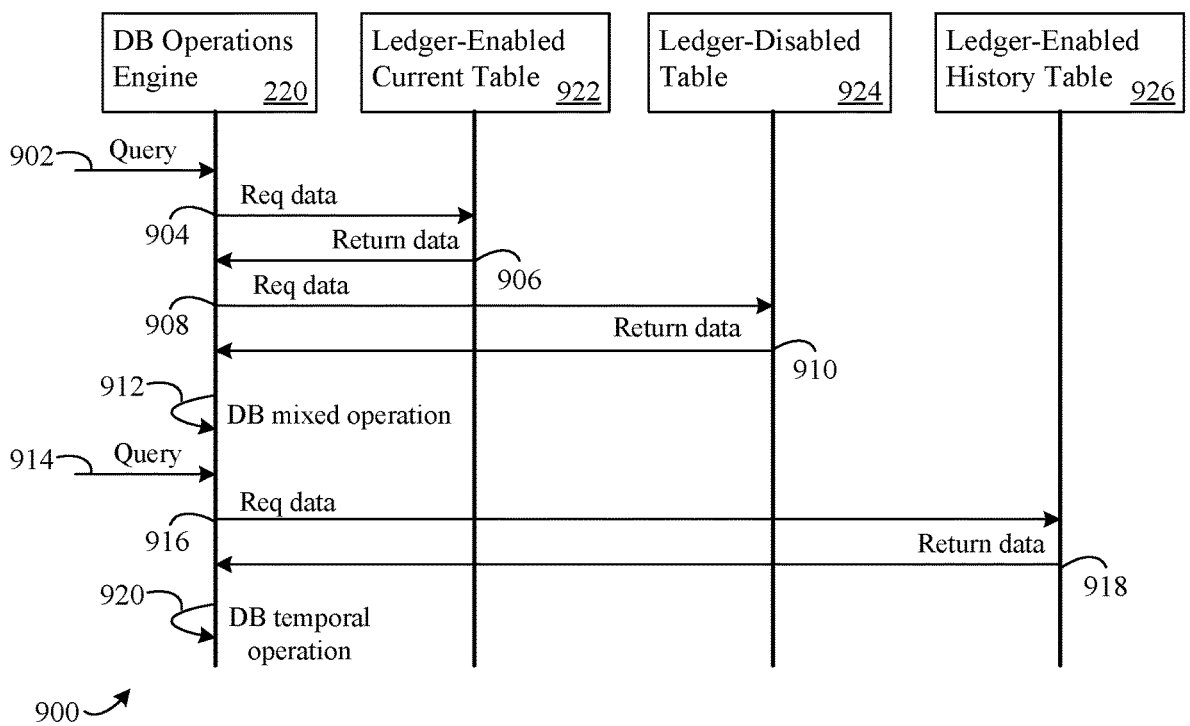
FIG. 9 shows a flow diagram for asynchronously determining relational data integrity using cryptographic data structures, in accordance with an example embodiment.

FIG. 9 shows a flow diagram 900 asynchronously determining relational data integrity using cryptographic data structures, according to example embodiments. System 100 in FIG. 1 and/or system 200 in FIG. 2 operate according to flow diagram 900, in embodiments. Further structural and operational examples will be apparent to persons skilled in the relevant art(s) based on the following descriptions. Flow diagram 900 is described as follows with respect to system 200 of FIG. 2.

Flow diagram 900 includes DB operations engine 220 of system 200 in FIG. 2, as well as a ledger-enabled current table 922, a ledger-disabled table 924, and a ledger-enabled history table 926. Flow diagram 900 begins at step 902.

In step 902, a query is received by DB operations engine 220. The query may be received from a user or administrator of a database in which ledger-enabled current table 922 and ledger-disabled table 924 are stored. In embodiments, the query specifies one or more operations related to ledger-enabled current table 922 and ledger-disabled table 924. In step 904, a request for data associated with ledger-enabled current table 922 is provided by DB operations engine 220, and in step 906, the requested data is read or returned from ledger-enabled current table 922. In step 908, a request for data associated with ledger-disabled table 924 is provided by DB operations engine 220, and in step 910, the requested data is read or returned from ledger-disabled table 924. In step 912, one or more query operations specified in the query received in step 902 are performed. That is, protected relational data in a ledger-enabled table can be queried together with unprotected relational data from a ledger-disabled table to perform query operations.

Another portion of flow diagram 900 begins at step 914. In step 914, a query is received by DB operations engine 220. The query may be received from a user or administrator of a database in which ledger-enabled history table 926 is stored. In embodiments, the query specifies one or more temporal operations related to ledger-enabled history table 926. In step 916, a request for data associated with ledger-enabled history table 926 is provided by DB operations engine 220, and in step 918, the requested data is read or returned from ledger-enabled history table 926. In step 920, one or more temporal query operations specified in the query received in step 914 are performed. That is, the historical versions of data maintained in history tables are also in relational form and associated with the transaction that generated them. Accordingly, temporal operations on this historical data are enabled, according to embodiments.

It is also contemplated herein that ledgers, e.g., for data representations therein having a table format, are also enabled for database operations such as queries, according to embodiments, as similarly described above for flow diagram 900, at least because internal data tables are not directly exposed to users.

The embodiments herein for asynchronously determining relational data integrity using cryptographic data structures also enable the truncation of history tables and/or ledgers described above. Although truncating the ledger and history tables limits the ability to reconstruct the full state of data and verify it, some scenarios for the described embodiments only require the need to preserve the transaction history for a specific amount of time, a frequency of use, an obsolescence factor, and/or the like. Thus, truncation of the transaction history to reclaim space in the database may be performed. To address these scenarios, truncating ledgers and/or history tables, while still preserving the information required to minimize an attacker's ability to tamper with the data elements whose history was removed, and to mitigate other types of data loss/corruption, embodiments include aspects as follows.

Because the verification of transactions, tables, and legers depends on the latest hash value of blocks in the hybrid blockchain, validating the remaining portions of a ledger, even after a "prefix" gets truncated, is enabled, for embodiments. This idea is similarly applied for the use of a Merkle tree, as leaf level nodes can always be removed without affecting the ability to generate and verify the root hash value, as noted herein. In embodiments, truncation includes one or more of truncating history tables and/or ledgers based on a time that entries have existed therein, based on a frequency of use of entries therein, based on entries therein no longer being associated with entries in a current table (i.e., "unassociated" historical entries), and/or the like.

Figure 10:
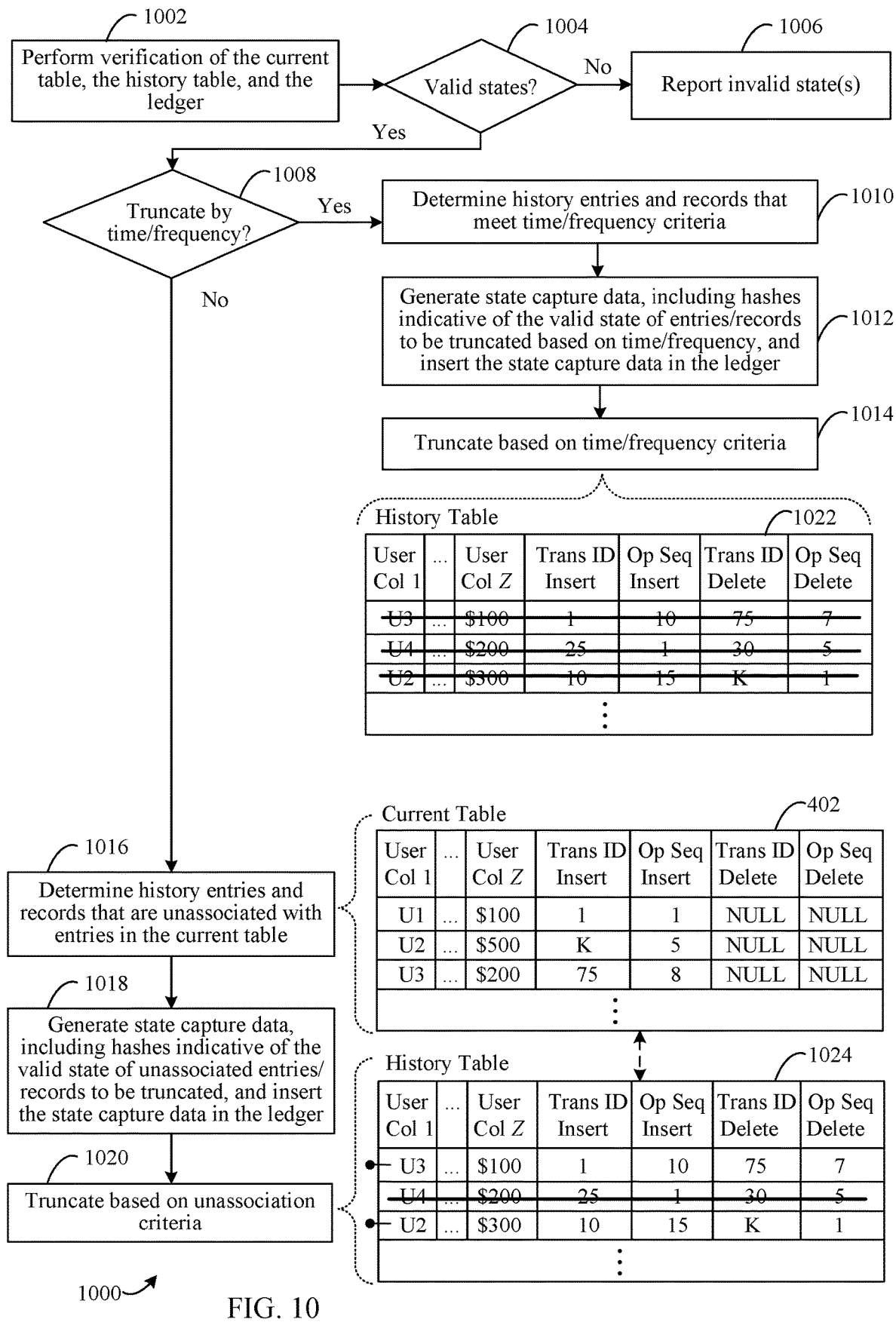
FIG. 10 shows a flowchart for asynchronously determining relational data integrity using cryptographic data structures, in accordance with an example embodiment.

Turning now to FIG. 10, a flowchart 1000 for asynchronously determining relational data integrity using cryptographic data structures is show, according to an example embodiment. System 100 in FIG. 1 and/or system 200 in FIG. 2 may operate according to flowchart 1000, which may be an embodiment of flowchart 300 in FIG. 3 and/or flowchart 800 in FIG. 8. Further structural and operational examples will be apparent to persons skilled in the relevant art(s) based on the following descriptions. Flowchart 1000 is described below primarily with respect to system 100 of FIG. 1 and system 200 of FIG. 2, and data structures 400 of FIG. 4. For instance, current table 402 of FIG. 4 is referenced with respect to flowchart 1000, along with a history table 1022 and a history table 1024 that correspond do different embodiments for truncation of history table 404 of FIG. 4.

Flowchart 1000 begins at step 1002. In step 1002, a verification of a current table, a history table, and a ledger is performed. For example, verification is performed as similarly described with respect to flowchart 800 in FIG. 8, in embodiments, such as for current table 402, history table 404, and ledger 406 of data structures 400 in FIG. 4.

In step 1004, it is determined if the states of the data in the current table, the history table, and the ledger are valid. For instance, the verification of step 1002 indicates valid or invalid states. If the states of one or more of the current table, the history table, and/or the ledger are not valid, flowchart 1000 continues to step 1006 where any invalid states are reported. If the states are valid, flowchart 1000 continues to step 1008. In step 1008, it is determined if truncation will be performed based on time, e.g., an age of the data, or a frequency of use of the data. In embodiments, data is old, as specified by a setting for ledger manager 208, is truncated. If truncation by time/frequency is enabled or set, flowchart 1000 continues to step 1010; if not, flowchart 1000 continues to step 1016 described below In step 1010, history entries and records that meet time/frequency criteria are determined. For instance, entries in a history table such as history table 404 in FIG. 4, as well as records in a ledger such as ledger 406 in FIG. 4, include time stamps or other information indicative of transaction times, in embodiments. Similarly, ledger manager 208 is configured to track a frequency of use associated with entries in tables. The age of data in tables/records and/or its frequency of use may be thus determined by ledger manager 208 and/or DB operations engine 220 of FIG. 2. History entries and records in ledgers that meet time/frequency criteria are designated for truncation.

In step 1012, state capture data is generated. The state capture data is generated by ledger manager 208 and/or hash generator 214 of FIG. 2, and includes at least one state hash value that is indicative of a valid state for at least one respective entry or record that meets time/frequency truncation criteria. In embodiments, the state hash value(s) is stored or inserted in the ledger such as ledger 406 in FIG. 4, as an update, that while not including complete details for transactions of the to-be-truncated data, does capture a representation of these transactions and a validation for their states as proof of their presence and integrity at the time the truncation is performed.

In step 1014, truncation of the entries and records identified in step 1010 is performed. For instance, ledger manager 208 and/or DB operations engine 220 are configured, in embodiments, to delete or truncate the identified entries and records meeting the time and/or frequency truncation criteria. As illustrated for truncated history table 1022 in FIG. 10, the first three rows of this table meet criteria for time and/or frequency truncation, and are truncated or removed. Likewise, records in a ledger are removed by blockchain engine 212 and/or DB operations engine 220, according to embodiments.

As noted above, when truncation by time/frequency is not configured, flowchart 1000 continues from step 1008 to step 1016 for truncation based on un-association. In step 1016, history entries and records are determined that are unassociated (i.e., not associated) with entries in the current table. For example, entries in history tables and records include transaction identifiers, operation sequence numbers, user identifiers, and/or other information which is also present in a current table for a given transaction, and therefore, history table entries and records that are associated with entries in a current table, or by elimination unassociated, are able to be determined and identified by ledger manager 208 and/or DB operations engine 220 of FIG. 2. History entries and records that meet an unassociation criteria are designated for truncation. As a non-limiting example regarding unassociated criteria for historical entries, when an entry in a current table is deleted or removed based on a transaction or operation, a historical entry will reflect this change in a history table and also in a ledger, but the current table no longer maintains the deleted or removed entry. Thus, the history table and corresponding record in the ledger are now unassociated with transactions reflected in entries maintained by the current table. As exemplarily illustrated, current table 402 can be cross-referenced with a history table, such as history table 404 shown post-truncation as truncated history table 1024, to determine and identify entries meeting the unassociation criteria. In this example, the first and third rows the history table correspond to transactions associated with entries in current table 404, but the second row specifies a particular transaction associated with user 'U4' that is not present in current table 402. Likewise, identification is performed for records in a ledger with respect to a current table.

In step 1018, state capture data is generated. This state capture data is generated by ledger manager 208 and/or hash generator 214 of FIG. 2, and includes at least one state hash value that is indicative of a valid state for at least one respective entry or record that meets unassociation truncation criteria. In embodiments, the state hash value(s) in step 1018 is stored or inserted in the ledger such as ledger 406 in FIG. 4, as an update, that while not including complete details for transactions of the to-be-truncated data, does capture a representation of these transactions and a validation for their states as proof of their presence and integrity at the time the truncation is performed.

In step 1020, truncation of the entries and records identified in step 1016 is performed. For instance, ledger manager 208 and/or DB operations engine 220 are configured, in embodiments, to delete or truncate the identified entries and records meeting the unassociation truncation criteria. As illustrated for truncated history table 1024 in FIG. 10, the second row of this table meets criteria for unassociation truncation, and is truncated or removed. That is, the second row specifies a particular transaction associated with user 'U4' that is not present in current table 402. Likewise, records in a ledger are removed by blockchain engine 212 and/or DB operations engine 220, according to embodiments.

In a similar manner as described above ledger view tables, as described herein, are subject to truncation operations, in embodiments.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 200 of FIG. 2, system 300 of FIG. 3, and graphs 600 of FIG. 6, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
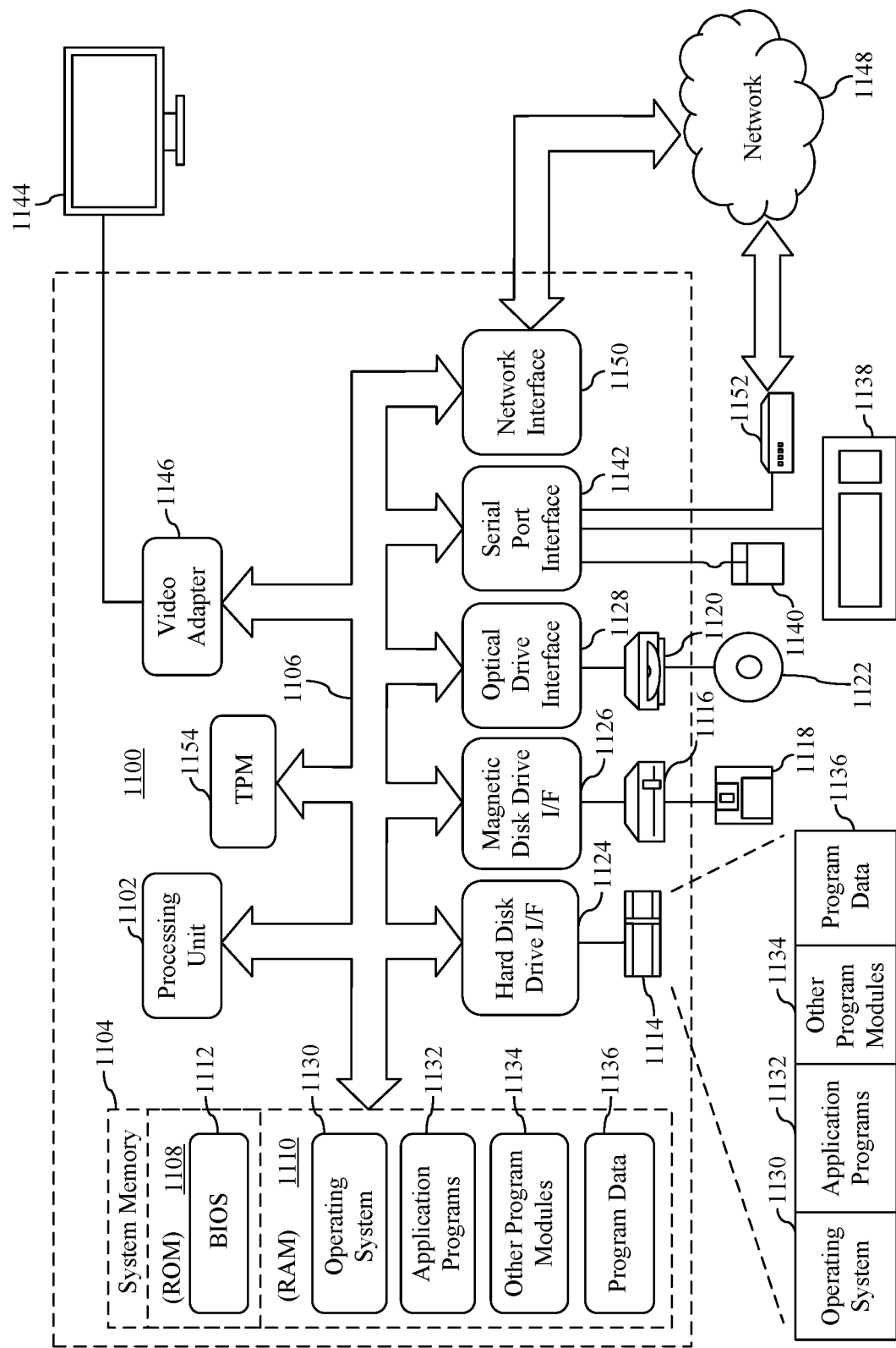
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices or systems similar to computing device 1100, or multiple instances of computing device 1100, in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, servers, and/or clusters, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as but not limited to, system 100 of FIG. 1, system 200 of FIG. 2, data structures 400 of FIG. 4, and data structures 500 of FIG. 5, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

TPM 1154 may be connected to bus 1106, and may be an embodiment of any TPM, as would be understood by one of skill in the relevant art(s) having the benefit of this disclosure. For example, TPM 1154 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for asynchronously determining relational data integrity using cryptographic data structures. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

As described, asynchronously determining relational data integrity using cryptographic data structures utilizes hybrid blockchains that include a blockchain framework in addition to hierarchical hash data structures to effectively and efficiently, with respect to system processing and memory footprint, allow the verification of data tables and ledgers via block receipts, as well as allow for cryptographic transaction receipts for individual transactions reflected in the data. That is, the embodiments herein utilize a unique combination of cryptographic data structures that provide for improved accuracy and resource efficiencies that was previously not available for software services and hardware implementations, much less for asynchronously determining relational data integrity using cryptographic data structures described herein.

The data structures described herein for ledgers enable fast appends of new transactions, records, and blocks to the tail of the ledger that allow for high transaction throughput, and low storage overhead of the data structure that allows for a large number of transactions over time without significant space overhead. This in turn enables the frequent dispensing of cryptographic transaction receipts, as very large numbers of transactions can be performed in database implementations. Moreover, efficient external verification of the integrity of the data structures, even for very large numbers of transactions is provided by embodiments, and enable external verification against forks in the ledgers by checking that a receipt generated for a given block can be derived from an earlier receipt at a prior block. For high throughput systems, there can be millions or more of transactions that have occurred between the two receipts, and thus the verification described herein is very efficient to meet this scenario.

Additionally, embodiments provided for the ability to externally verify that a given transaction is contained in a ledger in an efficient manner, allowing users to verify that their transaction is part of a specific block in the hybrid blockchain of ledger. Here, only one signature is required to be generated for a large set of transactions, but this single signature still enables externally verifying that a specific user transaction is part of this set. Accordingly, non-repudiation is achieved in the described embodiments.

Finally, as described herein, a hybrid blockchain model is utilized for embodiments, where a blockchain framework with large blocks, e.g. 1000-100,000 transactions/block, but where each block contains the underlying transactions/records as a hierarchical has data structure such as a Merkle tree. The intermediate nodes of the Merkle trees is not stored, in embodiments, but can be recomputed quickly because the number of transactions is relatively small, therefore eliminating the storage overhead. Additionally, constructing Merkle trees as the block is generated is not significantly more expensive than hashing the transactions for insertion in a blockchain as all nodes are known ahead of time and Merkle trees are built from the bottom-up with one pass. This unique hybrid combination outperforms blockchains by themselves because large block sizes compromise processing efficiency and the ability to quickly verify containment of a transaction in a block, and also Merkle trees built on top of all the transactions in a ledger enable, and for which only the root hash value is stored in a block, decreasing memory footprint associated with the persistence of Merkle trees for large blocks.

The additional examples and embodiments described in this Section may be applicable to examples disclosed in any other Section or subsection of this disclosure.

Embodiments in this description provide for systems, devices, and methods for asynchronously determining relational data integrity using cryptographic data structures. For instance, a method performed by a computing device is described herein for performing such embodiments. The method includes including in a history table an entry from a current table of a relational database, the history table being associated with the current table, based on the entry from the current table being designated in a transaction that specifies a change to the entry. The method also includes generating a record of the transaction in accordance with a ledger of the relational database by generating a transaction hash value over the entry in the history table and a changed entry in the current table that is generated by the transaction that was performed on the entry, and inserting the transaction hash value and transaction information into the record. The method also includes generating a hierarchical hash data structure including, as leaf nodes, the record and the transaction hash and a plurality of additional records corresponding to prior transactions and respective hash values thereof, and storing, in a current block of a hybrid blockchain, a root hash value of the hierarchical hash data structure, a prior hash value of an immediately preceding block of the hybrid blockchain, the record, and the plurality of additional records. The method further includes generating, asynchronously with respect to transactions performed on the current table, a block receipt that includes a current hash value of the current block and that captures a validity state of the current table, the history table, and the ledger, and providing the block receipt to a secure data store.

In an embodiment, the method includes generating a cryptographic transaction receipt specific to the transaction, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure, and providing the cryptographic transaction receipt to a user associated with the transaction. In a further embodiment, the method includes receiving a representation of the cryptographic transaction receipt subsequent to said providing the cryptographic transaction receipt, identifying the current block based on the receipt information, determining a receipt-specific root hash value based on the transaction hash value, the sibling transaction hash value, and the intermediate hash values, and validating the transaction based on the determined receipt-specific root hash value being the same as the root hash value.

In an embodiment of the method, the hierarchical hash data structure includes a Merkle tree, and storing, in the current block, the root hash value includes excluding any leaf hash values and any intermediate hash values of the Merkle tree in said storing, and storing only the root hash value of the Merkle tree.

In an embodiment, the method includes performing verification of the current table, the history table, and the ledger. In the embodiment, performing verification of the current table is performed according to one or more of receiving a representation of the block receipt and zero or more additional representations of additional block receipts as block receipt representations; for each of the block receipt representations, verifying that a respective block hash value of a block of the hybrid blockchain matches a hash value of a corresponding block receipt representation; for each block of the hybrid blockchain, verifying that the respective block hash value determined therefor matches a corresponding value of an immediately subsequent block; for each block of the hybrid blockchain verifying a respective root hash value of a block by regenerating, from stored transactions associated of the block, a respective hierarchical hash data structure; for each transaction in the ledger, verifying that an aggregate hash value of associated entries in at least one of the current table or the history table matches a respective transaction hash value; for each entry in the current table and the history table, verifying that a corresponding transaction is present in the ledger; or verifying that an index associated with the current table or the history table correctly corresponds to at least one of a clustered index or a heap of the relational database. In furtherance of the embodiment, the method includes determining that a performed verification indicates a valid state of the current table, the history table, and the ledger, generating state capture data, including a state hash value, that is indicative of the valid state, inserting the state capture data into the ledger, and truncating one or more of a portion of entries in the history table or a corresponding portion of records in the ledger based on at least one of a temporal threshold associated with the portion of entries and the corresponding portion of records have been stored, or a determination that the portion of entries and the corresponding portion of records are unassociated with any entries in the current table.

In an embodiment, the method includes at least one of performing a mixed operation in the relational database that includes first data of the current table and second data of another table for which association with any ledger is not implemented, or performing a temporal operation in the relational database that includes historical data of the historical table.

A system is also described herein. The system may be configured and enabled in various ways for asynchronously determining relational data integrity using cryptographic data structures, as described herein. In an embodiment, the system includes a processing system that includes one or more processors, and a memory that stores computer program instructions, that when executed, configure the processing system to include in a history table an entry from a current table of a relational database, the history table being associated with the current table, based on the entry from the current table being designated in a transaction that specifies a change to the entry. The processing system is also configured, by the computer program instructions, to generate a record of the transaction in accordance with a ledger of the relational database including to generate a transaction hash value over the entry in the history table and a changed entry in the current table that is generated by the transaction that was performed on the entry, and to insert the transaction hash value and transaction information into the record. The processing system is also configured, by the computer program instructions, to generate a hierarchical hash data structure including, as leaf nodes, the record and the transaction hash and a plurality of additional records corresponding to prior transactions and respective hash values thereof, and store, in a current block of a hybrid blockchain, a root hash value of the hierarchical hash data structure, a prior hash value of an immediately preceding block of the hybrid blockchain, the record, and the plurality of additional records. The processing system is also configured, by the computer program instructions, to generate, asynchronously with respect to transactions performed on the current table, a block receipt that includes a current hash value of the current block and that captures a validity state of the current table, the history table, and the ledger, and provide the block receipt to a secure data store.

In an embodiment of the system, the processing system is further configured, by the computer program instructions, to generate a cryptographic transaction receipt specific to the transaction, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure, and provide the cryptographic transaction receipt to a user associated with the transaction. In furtherance of the embodiment of the system, the processing system is further configured, by the computer program instructions, to receive a representation of the cryptographic transaction receipt subsequent to said providing the cryptographic transaction receipt, identify the current block based on the receipt information, determine a receipt-specific root hash value based on the transaction hash value, the sibling transaction hash value, and the intermediate hash values, and validate the transaction based on the determined receipt-specific root hash value being the same as the root hash value.

In an embodiment of the system, the hierarchical hash data structure includes a Merkle tree, and the processing system, to store in the current block the root hash value, is further configured by the computer program instructions to, exclude any leaf hash values and any intermediate hash values of the Merkle tree in said storing, and store only the root hash value of the Merkle tree.

In an embodiment of the system, the processing system is further configured, by the computer program instructions, to perform verification of the current table, the history table, and the ledger, including, one or more of, to receive a representation of the block receipt and zero or more additional representations of additional block receipts as block receipt representations; for each of the block receipt representations, to verify that a respective block hash value of a block of the hybrid blockchain matches a hash value of a corresponding block receipt representation; for each block of the hybrid blockchain, to verify that the respective block hash value determined therefor matches a corresponding value of an immediately subsequent block; for each block of the hybrid blockchain, to verify a respective root hash value of a block by regenerating, from stored transactions associated of the block, a respective hierarchical hash data structure; for each transaction in the ledger, to verify that an aggregate hash value of associated entries in at least one of the current table or the history table matches a respective transaction hash value; for each entry in the current table and the history table, to verify that a corresponding transaction is present in the ledger; and to verify that an index associated with the current table or the history table correctly corresponds to at least one of a clustered index or a heap of the relational database.

In an embodiment of the system, the processing system is further configured, by the computer program instructions, to determine that a performed verification indicates a valid state of the current table, the history table, and the ledger, generate state capture data, including a state hash value, that is indicative of the valid state, insert the state capture data into the ledger, and truncate one or more of a portion of entries in the history table or a corresponding portion of records in the ledger based on at least one of a temporal threshold associated with the portion of entries and the corresponding portion of records have been stored or a determination that the portion of entries and the corresponding portion of records are unassociated with any entries in the current table.

In an embodiment of the system, the processing system is further configured, by the computer program instructions, to perform a mixed operation in the relational database that includes first data of the current table and second data of another table for which association with any ledger is not implemented, or to perform a temporal operation in the relational database that includes historical data of the historical table.

A computer-readable storage medium having program instructions recorded thereon that, when executed by a processing system, performs a method, is also described. The methods are for asynchronously determining relational data integrity using cryptographic data structures, as described herein. The method includes including in a history table an entry from a current table of a relational database, the history table being associated with the current table, based on the entry from the current table being designated in a transaction that specifies a change to the entry. The method also includes generating a record of the transaction in accordance with a ledger of the relational database by generating a transaction hash value over the entry in the history table and a changed entry in the current table that is generated by the transaction that was performed on the entry, and inserting the transaction hash value and transaction information into the record. The method also includes generating a hierarchical hash data structure including, as leaf nodes, the record and the transaction hash and a plurality of additional records corresponding to prior transactions and respective hash values thereof, and storing, in a current block of a hybrid blockchain, a root hash value of the hierarchical hash data structure, a prior hash value of an immediately preceding block of the hybrid blockchain, the record, and the plurality of additional records. The method further includes generating, asynchronously with respect to transactions performed on the current table, a block receipt that includes a current hash value of the current block and that captures a validity state of the current table, the history table, and the ledger, and providing the block receipt to a secure data store.

In an embodiment of the computer-readable storage medium, the method includes generating a cryptographic transaction receipt specific to the transaction, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure, and providing the cryptographic transaction receipt to a user associated with the transaction. In a further embodiment of the computer-readable storage medium, the method includes receiving a representation of the cryptographic transaction receipt subsequent to said providing the cryptographic transaction receipt, identifying the current block based on the receipt information, determining a receipt-specific root hash value based on the transaction hash value, the sibling transaction hash value, and the intermediate hash values, and validating the transaction based on the determined receipt-specific root hash value being the same as the root hash value.

In an embodiment of the computer-readable storage medium, the hierarchical hash data structure includes a Merkle tree, and in the method, storing, in the current block, the root hash value includes excluding any leaf hash values and any intermediate hash values of the Merkle tree in said storing, and storing only the root hash value of the Merkle tree.

In an embodiment of the computer-readable storage medium, the method includes performing verification of the current table, the history table, and the ledger. In the embodiment, performing verification of the current table is performed according to one or more of receiving a representation of the block receipt and zero or more additional representations of additional block receipts as block receipt representations; for each of the block receipt representations, verifying that a respective block hash value of a block of the hybrid blockchain matches a hash value of a corresponding block receipt representation; for each block of the hybrid blockchain, verifying that the respective block hash value determined therefor matches a corresponding value of an immediately subsequent block; for each block of the hybrid blockchain verifying a respective root hash value of a block by regenerating, from stored transactions associated of the block, a respective hierarchical hash data structure; for each transaction in the ledger, verifying that an aggregate hash value of associated entries in at least one of the current table or the history table matches a respective transaction hash value; for each entry in the current table and the history table, verifying that a corresponding transaction is present in the ledger; or verifying that an index associated with the current table or the history table correctly corresponds to at least one of a clustered index or a heap of the relational database.

In an embodiment of the computer-readable storage medium, the method includes at least one of performing a mixed operation in the relational database that includes first data of the current table and second data of another table for which association with any ledger is not implemented, or performing a temporal operation in the relational database that includes historical data of the historical table.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a computing system, the method comprising:
   including in a history table an entry from a current table of a relational database, the history table being associated with the current table, based on the entry from the current table being designated in a transaction that specifies a change to the entry;
   generating a record of the transaction in accordance with a ledger of the relational database by:
      generating a transaction hash value by hashing the entry in the history table and a changed entry in the current table that is generated by the transaction that was performed on the entry; and
      inserting the transaction hash value and transaction information into the record;
   generating a hierarchical hash data structure including, as leaf nodes:
      the record and the transaction hash, and
      a plurality of additional records corresponding to prior transactions and respective hash values thereof;
   storing, in a current block of a hybrid blockchain, a root hash value of the hierarchical hash data structure, a prior hash value of an immediately preceding block of the hybrid blockchain, the record, and the plurality of additional records;
   generating, asynchronously with respect to transactions performed on the current table, a block receipt that includes a current hash value of the current block and that captures a validity state of the current table, the history table, and the ledger; and
   providing the block receipt to a secure data store.

2. The method of claim 1, further comprising:
   generating a cryptographic transaction receipt specific to the transaction, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure; and
   providing the cryptographic transaction receipt to a user associated with the transaction.

3. The method of claim 2, further comprising:
   receiving a representation of the cryptographic transaction receipt subsequent to said providing the cryptographic transaction receipt;
   identifying the current block based on the receipt information;
   determining a receipt-specific root hash value based on the transaction hash value, the sibling transaction hash value, and the intermediate hash values; and
   validating the transaction based on the determined receipt-specific root hash value being the same as the root hash value.

4. The method of claim 1, wherein the hierarchical hash data structure comprises a Merkle tree; and
   wherein storing, in the current block, the root hash value includes:
      excluding any leaf hash values and any intermediate hash values of the Merkle tree in said storing, and
      storing only the root hash value of the Merkle tree.

5. The method of claim 1, further comprising performing verification of the current table, the history table, and the ledger, according to one or more of:
   receiving a representation of the block receipt and zero or more additional representations of additional block receipts as block receipt representations;
   for each of the block receipt representations, verifying that a respective block hash value of a block of the hybrid blockchain matches a hash value of a corresponding block receipt representation;
   for each block of the hybrid blockchain, verifying that the respective block hash value determined therefor matches a corresponding value of an immediately subsequent block;
   for each block of the hybrid blockchain, verifying a respective root hash value of a block by regenerating, from stored transactions associated of the block, a respective hierarchical hash data structure;
   for each transaction in the ledger, verifying that an aggregate hash value of associated entries in at least one of the current table or the history table matches a respective transaction hash value;
   for each entry in the current table and the history table, verifying that a corresponding transaction is present in the ledger; or
   verifying that an index associated with the current table or the history table correctly corresponds to at least one of a clustered index or a heap of the relational database.

6. The method of claim 1, further comprising:
   determining a performed verification indicates a valid state of the current table, the history table, and the ledger;
   generating state capture data, including a state hash value, that is indicative of the valid state;
   inserting the state capture data into the ledger; and
   truncating one or more of a portion of entries in the history table or a corresponding portion of records in the ledger based on at least one of:
      a temporal threshold associated with the portion of entries and the corresponding portion of records have been stored; or
      a determination that the portion of entries and the corresponding portion of records are unassociated with any entries in the current table.

7. The method of claim 1, further comprising at least one of:
   performing a mixed operation in the relational database that includes first data of the current table and second data of another table for which association with any ledger is not implemented; or
   performing a temporal operation in the relational database that includes historical data of the historical table.

8. A system that comprises:
a processing system comprising one or more processors; and
a memory configured to store program instructions that, when executed, configure the processing system to:
include in a history table an entry from a current table of a relational database, the history table being associated with the current table, based on the entry from the current table being designated in a transaction that specifies a change to the entry;
generate a record of the transaction in accordance with a ledger of the relational database, including to:
generate a transaction hash value by hashing the entry in the history table and a changed entry in the current table that is generated by the transaction that was performed on the entry; and
insert the transaction hash value and transaction information into the record;
generate a hierarchical hash data structure including, as leaf nodes:
the record and the transaction hash, and
a plurality of additional records corresponding to prior transactions and respective hash values thereof;
store, in a current block of a hybrid blockchain, a root hash value of the hierarchical hash data structure, a prior hash value of an immediately preceding block of the hybrid blockchain, the record, and the plurality of additional records;
generate, asynchronously with respect to transactions performed on the current table, a block receipt that includes a current hash value of the current block and that captures a validity state of the current table, the history table, and the ledger; and
provide the block receipt to a secure data store.

9. The system of claim 8, wherein the processing system is configured to:
generate a cryptographic transaction receipt specific to the transaction, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure; and
provide the cryptographic transaction receipt to a user associated with the transaction.

10. The system of claim 9, wherein the processing system is configured to:
receive a representation of the cryptographic transaction receipt subsequent to said providing the cryptographic transaction receipt;
identify the current block based on the receipt information;
determine a receipt-specific root hash value based on the transaction hash value, the sibling transaction hash value, and the intermediate hash values; and
validate the transaction based on the determined receipt-specific root hash value being the same as the root hash value.

11. The system of claim 8, wherein the hierarchical hash data structure comprises a Merkle tree; and
wherein the processing system, to store, in the current block, the root hash value, is configured to:
exclude any leaf hash values and any intermediate hash values of the Merkle tree in said storing, and
store only the root hash value of the Merkle tree.

12. The system of claim 8, wherein the processing system is configured to perform verification of the current table, the history table, and the ledger, including, one or more of, to:
receive a representation of the block receipt and zero or more additional representations of additional block receipts as block receipt representations;
for each of the block receipt representations, verify that a respective block hash value of a block of the hybrid blockchain matches a hash value of a corresponding block receipt representation;
for each block of the hybrid blockchain, verify that the respective block hash value determined therefor matches a corresponding value of an immediately subsequent block;
for each block of the hybrid blockchain, verify a respective root hash value of a block by regenerating, from stored transactions associated of the block, a respective hierarchical hash data structure;
for each transaction in the ledger, verify that an aggregate hash value of associated entries in at least one of the current table or the history table matches a respective transaction hash value;
for each entry in the current table and the history table, verify that a corresponding transaction is present in the ledger; and
verify that an index associated with the current table or the history table correctly corresponds to at least one of a clustered index or a heap of the relational database.

13. The system of claim 12, wherein the processing system is configured to:
determine that a performed verification indicates a valid state of the current table, the history table, and the ledger;
generate state capture data, including a state hash value, that is indicative of the valid state;
insert the state capture data into the ledger; and
truncate one or more of a portion of entries in the history table or a corresponding portion of records in the ledger based on at least one of:
a temporal threshold associated with the portion of entries and the corresponding portion of records have been stored; or
a determination that the portion of entries and the corresponding portion of records are unassociated with any entries in the current table.

14. The system of claim 8, wherein the processing system is configured to:
perform a mixed operation in the relational database that includes first data of the current table and second data of another table for which association with any ledger is not implemented; or
perform a temporal operation in the relational database that includes historical data of the historical table.

15. A computer-readable storage medium having program instructions recorded thereon that, when executed by a processing system, perform a method comprising:
including in a history table an entry from a current table of a relational database, the history table being associated with the current table, based on the entry from the current table being designated in a transaction that specifies a change to the entry;
generating a record of the transaction in accordance with a ledger of the relational database by:

generating a transaction hash value by hashing the entry in the history table and a changed entry in the current table that is generated by the transaction that was performed on the entry; and inserting the transaction hash value and transaction information into the record;

generating a hierarchical hash data structure including, as leaf nodes:

the record and the transaction hash, and a plurality of additional records corresponding to prior transactions and respective hash values thereof;

storing, in a current block of a hybrid blockchain, a root hash value of the hierarchical hash data structure, a prior hash value of an immediately preceding block of the hybrid blockchain, the record, and the plurality of additional records;

generating, asynchronously with respect to transactions performed on the current table, a block receipt that includes a current hash value of the current block and that captures a validity state of the current table, the history table, and the ledger; and providing the block receipt to a secure data store.

16. The computer-readable storage medium of claim 15, wherein the method includes:

generating a cryptographic transaction receipt specific to the transaction, asynchronously with respect to transaction operations performed on the current table, the cryptographic transaction receipt including the transaction hash value that identifies receipt information comprising at least one of a time of the transaction, a description of the transaction, or a transaction identifier, a sibling transaction hash value in the hierarchical hash data structure, and intermediate hash values for each intermediate ancestor node and their respective sibling nodes in the hierarchical hash data structure; and providing the cryptographic transaction receipt to a user associated with the transaction.

17. The computer-readable storage medium of claim 16, wherein the method includes:

receiving a representation of the cryptographic transaction receipt subsequent to said providing the cryptographic transaction receipt;

identifying the current block based on the receipt information;

determining a receipt-specific root hash value based on the transaction hash value, the sibling transaction hash value, and the intermediate hash values; and validating the transaction based on the determined receipt-specific root hash value being the same as the root hash value.

18. The computer-readable storage medium of claim 15, wherein the hierarchical hash data structure comprises a Merkle tree; and wherein storing, in the current block, the root hash value includes:

excluding any leaf hash values and any intermediate hash values of the Merkle tree in said storing, and storing only the root hash value of the Merkle tree.

19. The computer-readable storage medium of claim 15, wherein the method includes performing verification of the current table, the history table, and the ledger, according to one or more of:

receiving a representation of the block receipt and zero or more additional representations of additional block receipts as block receipt representations;

for each of the block receipt representations, verifying that a respective block hash value of a block of the hybrid blockchain matches a hash value of a corresponding block receipt representation;

for each block of the hybrid blockchain, verifying that the respective block hash value determined therefor matches a corresponding value of an immediately subsequent block;

for each block of the hybrid blockchain, verifying a respective root hash value of a block by regenerating, from stored transactions associated of the block, a respective hierarchical hash data structure;

for each transaction in the ledger, verifying that an aggregate hash value of associated entries in at least one of the current table or the history table matches a respective transaction hash value;

for each entry in the current table and the history table, verifying that a corresponding transaction is present in the ledger; or verifying that an index associated with the current table or the history table correctly corresponds to at least one of a clustered index or a heap of the relational database.

20. The computer-readable storage medium of claim 15, wherein the method includes at least one of:

performing a mixed operation in the relational database that includes first data of the current table and second data of another table for which association with any ledger is not implemented; or performing a temporal operation in the relational database that includes historical data of the historical table.

\* \* \* \* \*